US008555992B1

(12) United States Patent
Merkt

(10) Patent No.: US 8,555,992 B1
(45) Date of Patent: Oct. 15, 2013

(54) TURFPLANER WITH AUTOGRADE AND AUTODEPTH

(75) Inventor: Eric L. Merkt, Athens, AL (US)

(73) Assignee: G2 Turftools, Inc., Athens, AL (US)

( * ) Notice: Subject to any disclaimer, the term of this patent is extended or adjusted under 35 U.S.C. 154(b) by 399 days.

(21) Appl. No.: 13/028,290

(22) Filed: Feb. 16, 2011

(51) Int. Cl.
*A01B 43/00* (2006.01)

(52) U.S. Cl.
USPC .................................. 172/1; 172/32

(58) Field of Classification Search
USPC ........ 172/1, 19, 20, 32, 315, 490, 605, 684.5, 172/680, 292; 171/9, 13, 45, 78, 116, 124, 171/135, 142; 209/616, 634, 654; 241/109, 241/115, 124, 139, 74
See application file for complete search history.

(56) References Cited

U.S. PATENT DOCUMENTS

| 2,957,254 | A | | 10/1960 | Bederman et al. |
| 3,672,452 | A | * | 6/1972 | Miner ............................ 172/19 |
| 3,986,782 | A | * | 10/1976 | Durham ......................... 404/85 |
| 4,494,611 | A | | 1/1985 | Alvarez |
| 7,029,199 | B2 | * | 4/2006 | Mayfield et al. .......... 404/84.05 |
| 7,100,703 | B2 | * | 9/2006 | Etter ............................. 172/315 |
| 8,109,360 | B2 | * | 2/2012 | Stewart et al. ............... 181/148 |

FOREIGN PATENT DOCUMENTS

DE 102007050508 4/2009

* cited by examiner

*Primary Examiner* — Robert Pezzuto
(74) *Attorney, Agent, or Firm* — Joseph T. Guy; Perkins Law Firm, LLC

(57) ABSTRACT

An improved turfplaner system for leveling an area to a predetermined height is described. The turfplaner system includes a device capable of being transported over an area. The device includes a rotational elongated cutter with a first side and a second side and a control mechanism capable of independently altering a height of the first side of the rotational cutter and the second side of the rotational cutter relative to a predetermined height over the area.

29 Claims, 26 Drawing Sheets

TURFPLANER WITH AUTOGRADE AND AUTODEPTH

CROSS-REFERENCE TO RELATED APPLICATIONS

The present application is related to U.S. patent application Ser. No. 12/816,198 which claims priority to abandoned U.S. Provisional Appl. No. 61/187,067 filed Jun. 15, 2009.

BACKGROUND OF THE INVENTION

The present invention is directed to a machine for smoothing a turfed area to remove undulations. More specifically, the present invention is related to a turfplaner which comprises hydraulically activated levelers and a laser level guidance system.

There are many environments wherein a level grass surface is of utmost importance. By way of example, without limit thereto, are airplane runways, golf courses, sports fields and the like. Leveling a large area has never been an exact science. The most common technique is to utilize a box blade, also referred to as a landscaping box, which has a forward cutting blade and a rearward drag blade. The forward cutting blade gathers materials from high spots and drags the material along while riding on the rearward drag blade. The material from the high spots is deposited in the low spots thereby decreasing undulations. One disadvantage with a box blade is that the variation from gravitational planarity is mostly a function of the tractor used to pull the box blade. It is difficult to change the general contour with a box blade and doing so generally requires many passes.

A particular advantage of smooth turf is a decrease in injuries to users of the turf. This is particularly true with athletes, or horses, wherein injury can occur if uneven turf is encountered.

Yet another problem with fine turf areas is weed growth. Weed killers, pre-emergent chemicals and the like have lost favor due to the perceived problems of run-off and unintended deposition.

There has been a long standing desire for a simple way to achieve a level turf which is weed free without chemicals and without major effort and machinery.

SUMMARY OF THE INVENTION

The present invention is related to a device, and method, for leveling an area comprising turf or an area which is intended to receive turf either as seed or sod.

A particular feature of the present invention is that an area can be leveled precisely in one pass.

Yet another particular feature is that an area can be rid of weeds without the use of chemicals.

These and other advantages, as will be realized, are provided in a turfplaner system with a laser capable of emitting a planar light over an area and a device capable of being transported over the area. The device has a rotational elongated cutter and a pair of receivers for receiving the planar light wherein each receiver is a fixed vertical distance from the cutter and on separate ends of the cutter. A control mechanism moves the rotational cutter to maintain each receiver in a fixed vertical position relative to the planar light wherein as the turfplaner is transported over the area the cutter removes any material above a fixed distance below the planar light.

Yet another embodiment is provided in a method for leveling an area. The method includes:

providing a laser capable of emitting a planar light over an area;
providing a device capable of being transported over the area wherein the device has:
a rotational elongated cutter;
a pair of receivers for receiving the planar light wherein each receiver is a fixed vertical distance from the cutter and on separate ends of the cutter;
a control mechanism capable of moving the rotational cutter to maintain each receiver in a fixed vertical position relative to the planar light;
moving the device over the area wherein when the device is transported over the area the cutter removes any material above a fixed distance below the planar light.

A particularly preferred embodiment is provided in a turfplaner system. The turfplaner system includes a device capable of being transported over an area. The device includes a rotational elongated cutter with a first side and a second side and a control mechanism capable of independently altering a height of the first side of the rotational cutter and the second side of the rotational cutter relative to a predetermined height over the area.

Yet another embodiment is provided in a method for leveling an area. The method includes:
providing a device capable of being transported over the area wherein the device comprises a rotational elongated cutter comprising a first side and a second side and a control mechanism capable of independently altering a height of the first side of the rotational cutter and the second side of the rotational cutter relative to a predetermined height over the area; and
moving the device over the area wherein when the device is transported over the area the cutter removes any material above a fixed distance below the predetermined height.

BRIEF DESCRIPTIONS OF FIGURES

FIG. 1 is a top view of an embodiment of the turfplaner.
FIG. 2 is a right hand side view of an embodiment of the turfplaner.
FIG. 3 is a left hand side view of an embodiment of the turfplaner.
FIG. 4 is a front view of an embodiment of the turfplaner.
FIG. 5 is a rear view of an embodiment of the turfplaner.
FIG. 6 is a partial cut-away view of the left hand side of an embodiment of the turfplaner.
FIG. 7 is a perspective view of an embodiment of the cutter assembly in isolation.
FIG. 7A is an exploded view of an embodiment of the cutter of the turfplaner.
FIG. 8 is a partial expanded view of an embodiment of the cutter of the turfplaner.
FIG. 9 is a perspective view of the rear roller assembly of an embodiment of the turfplaner.
FIG. 10 is a perspective view of the conveyor of an embodiment of the turfplaner.
FIG. 11 is an exploded view of the gear drive assembly of an embodiment of the turfplaner.
FIG. 12 is a perspective view of an embodiment of the turfplaner.
FIG. 13 is a view of the hydraulic control system of an embodiment of the turfplaner.
FIG. 14 is a top view of an embodiment of the turfplaner.
FIG. 15 is a right side view of an embodiment of the turfplaner.
FIG. 16 is a left side view of an embodiment of the turfplaner.

DETAILED DESCRIPTION

The present invention is directed to a turfplaner. More specifically, the turfplaner planes to a predetermined level relative to a combination of a laser beam, existing structure or a predetermined depth.

The invention will be described with reference to the figures which form an integral part of the present invention. Throughout the description similar elements will be numbered accordingly.

As will be realized from the figures and description herein the turfplaner is intended for use behind a pull vehicle and most preferably behind a tractor. While not limited thereto, the turfplaner preferably derives power from a Power Take Off (PTO) on a tractor and from the tractor hydraulics. Other embodiments, such as a motor mounted on the turfplaner, are within the scope of the invention but a PTO drive is preferred due to cost and maintenance considerations.

The system comprises a laser which provides a planar fan beam. The turfplaner comprises an elongated cutter which removes material. Laser receivers on either side of the cutter detect whether the cutter is parallel to the fan beam or the correct distance below the fan beam. A rear transport mechanism rides on previously smoothed soil and provides a base. Hydraulic actuators raise, or lower, the blade on each end relative to the base to maintain planarity between the laser receivers and the fan beam at the proper height.

A particularly preferred embodiment of the turfplaner is illustrated and will be described with reference to the figures. The turfplaner comprises a generally rectangular frame comprising a left hand side frame, 1, and a right hand side frame, 2, with frame supports, 3-5, and a front roller, 33, spanning there between. A frame tongue, 6, and associated brace, 7, allow the turfplaner to be towed by a tractor or related tow equipment. A jack, 114, and coupler hitch, 115, are preferably provided as would be realized.

Figure 11:
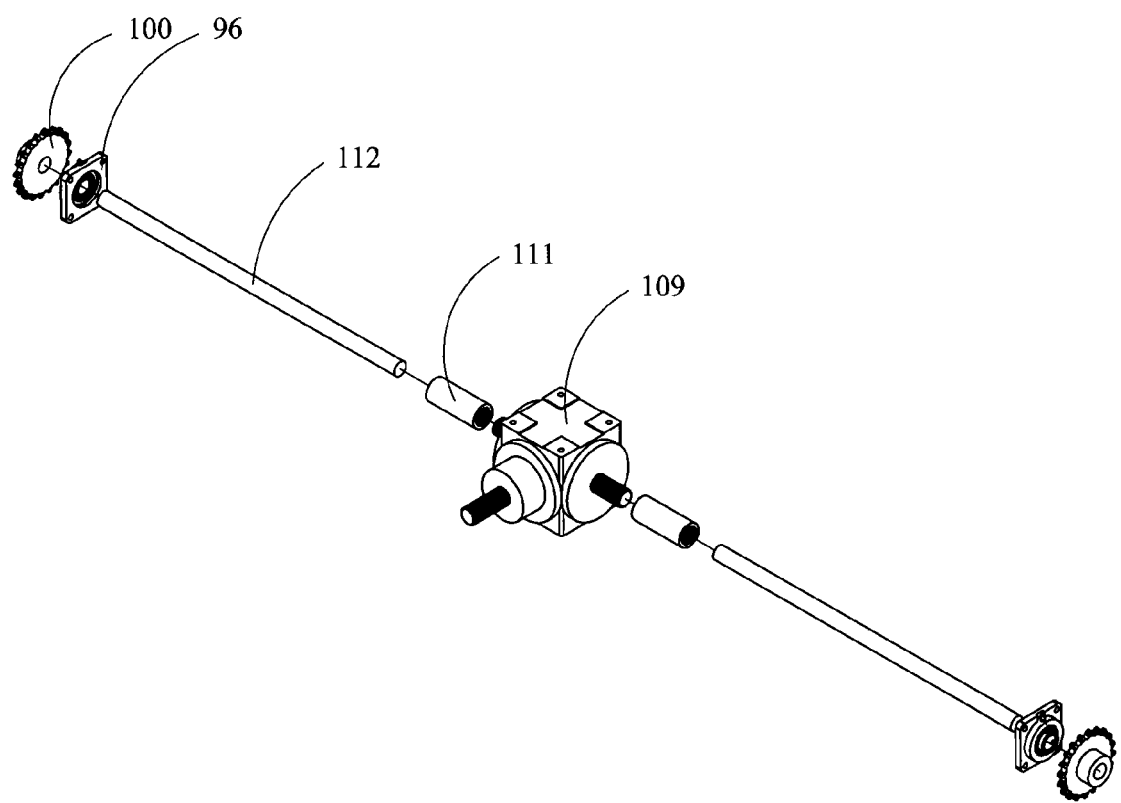
Figure 12:
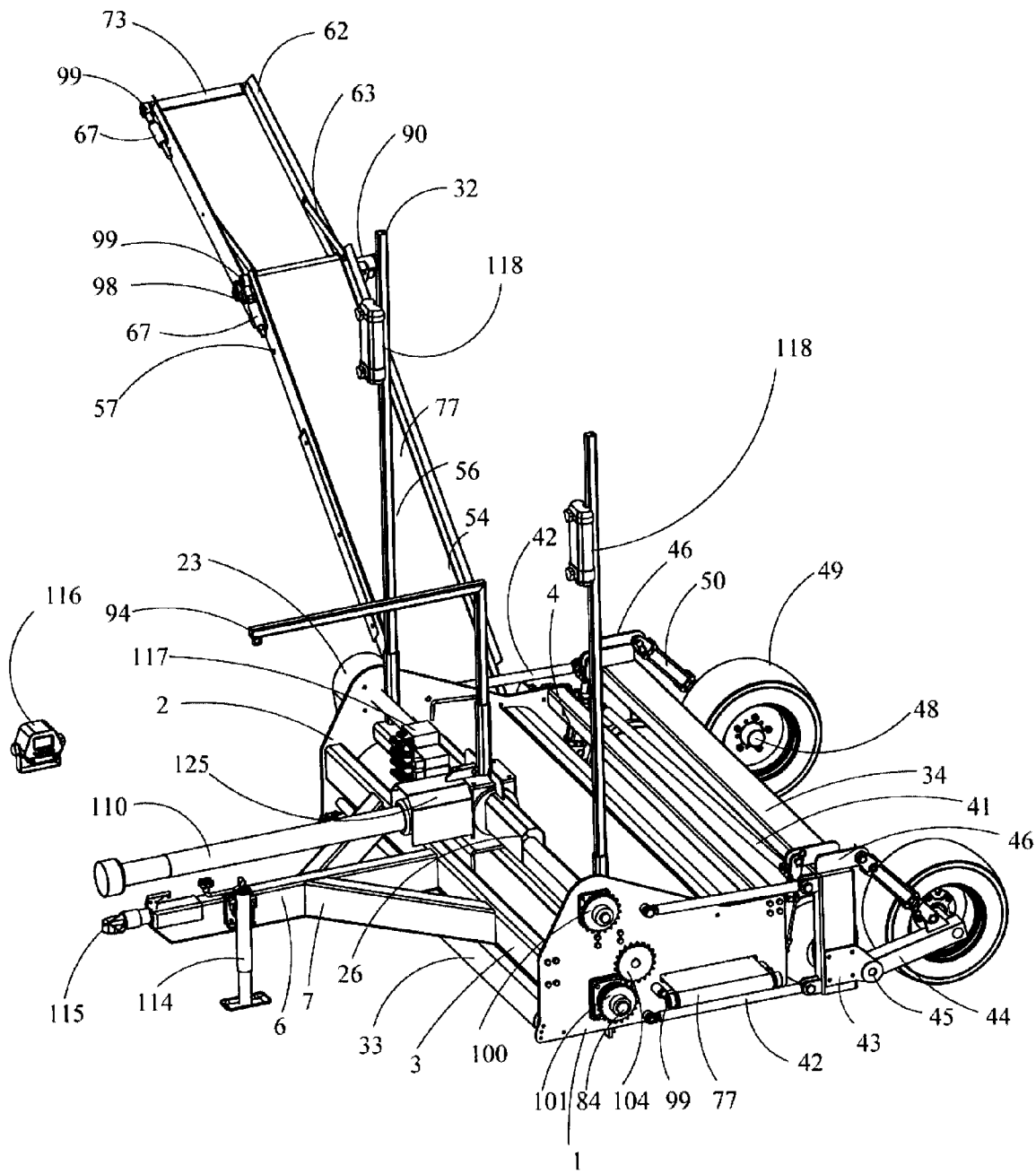
Figure 21:
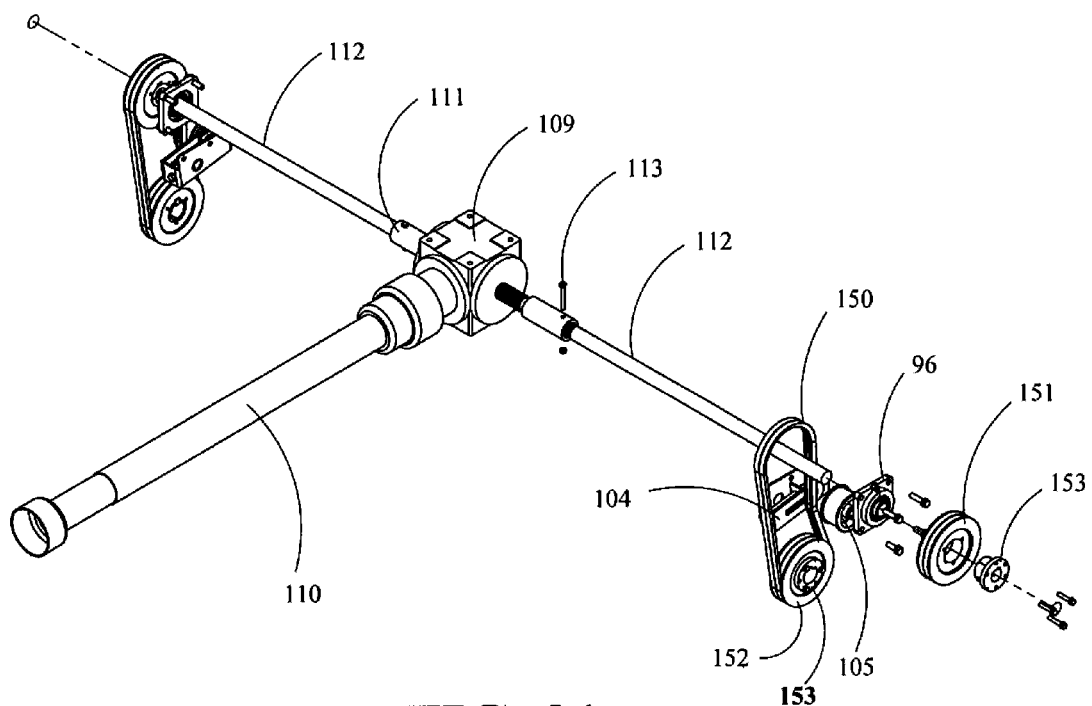
FIG. 21 is an exploded view of the gear drive assembly of an embodiment of the turfplaner.
Figure 22:
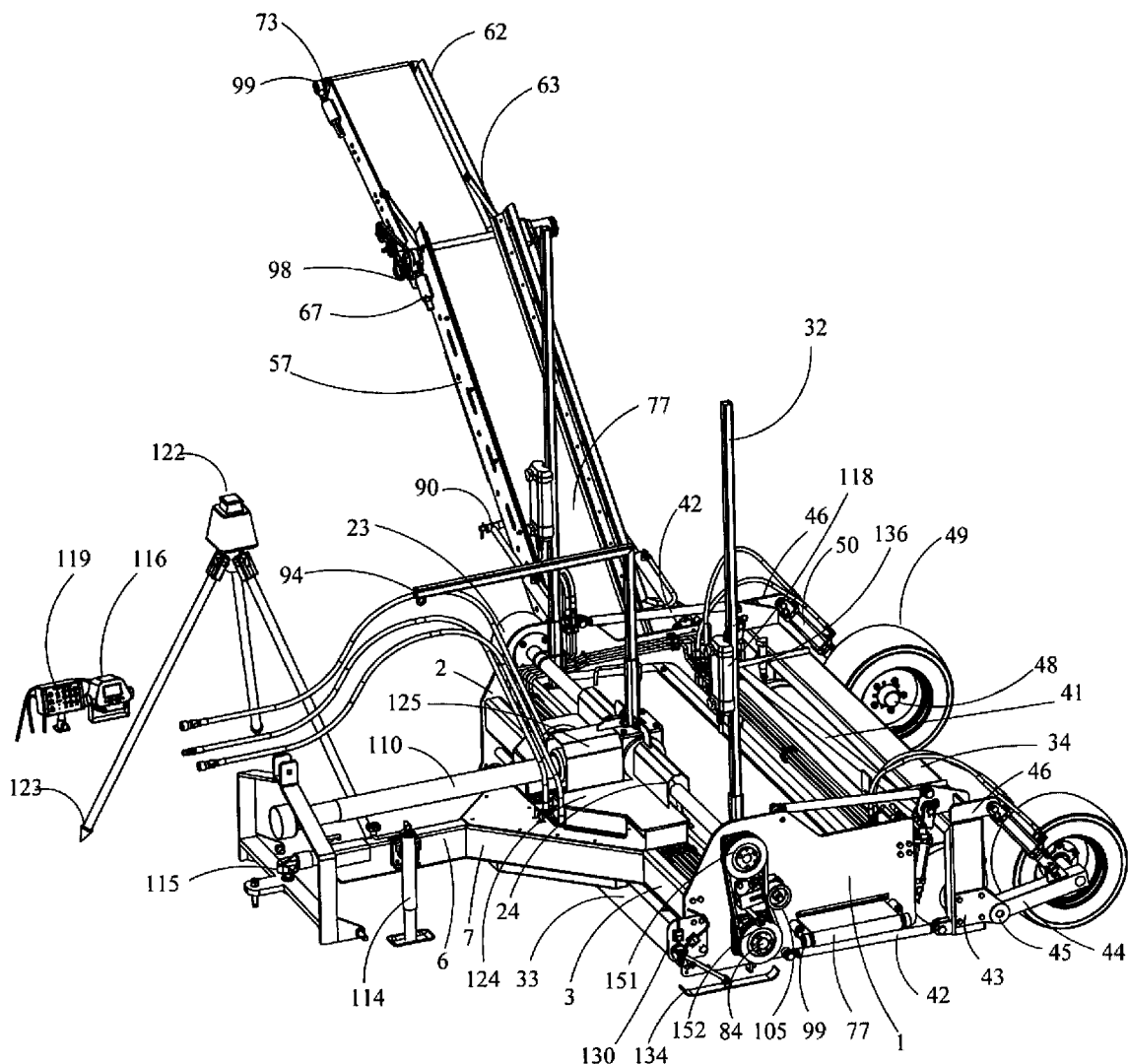
FIG. 22 is a perspective view of an embodiment of the turfplaner.

A drive assembly is illustrated in isolated view in FIGS. 11 and 21 and will be described with reference to FIGS. 11, 12, 14, 21, 22. A gear box, 109, is mounted on the frame. The gear box can be mounted on a gear box mounting plate, 8, for convenience. The gear box couples to the PTO of a tractor through a drive shaft, 110. The drive shaft is preferably coupled through universals on either side thereof as would be well known to those of skill in the art. A cover, 125, for the drive shaft and universal joints is preferred for safety and aesthetics. Half shafts, 112, are coupled to the gear box, 109, by half shaft couplers, 111, and associated fasteners, 113. Each half shaft is preferable supported by a half shaft bearing, 96. The half shaft is coupled to a half shaft drive sprocket, 100. A half shaft cover, 25, with half shaft coupler cover, 26, are provided for safety and aesthetics. A hydraulic hose support, 94, secures the hydraulic hose extending between the tractor and turfplaner from becoming entangled with other elements. Alternatively, a drive belt, 150, can be employed with associated pulleys, 151 and 152, tensioning rollers, 105, and bushings, 153.

The half shaft drive sprocket, 100, is coupled with a cutter head drive sprocket, 101. A drive idler sprocket, 104, is preferably provided to facilitate installation and tightening of a chain around the sprockets as would be realized in the art. The chain is not shown for clarity. Belts with associated pulleys and tensioning rollers can be used instead of a chain assembly. A preferred chain guard, 23, covers the chain and sprockets for safety and aesthetics. A single shaft could be employed but half shafts are preferred to minimize torque.

Figure 7A:
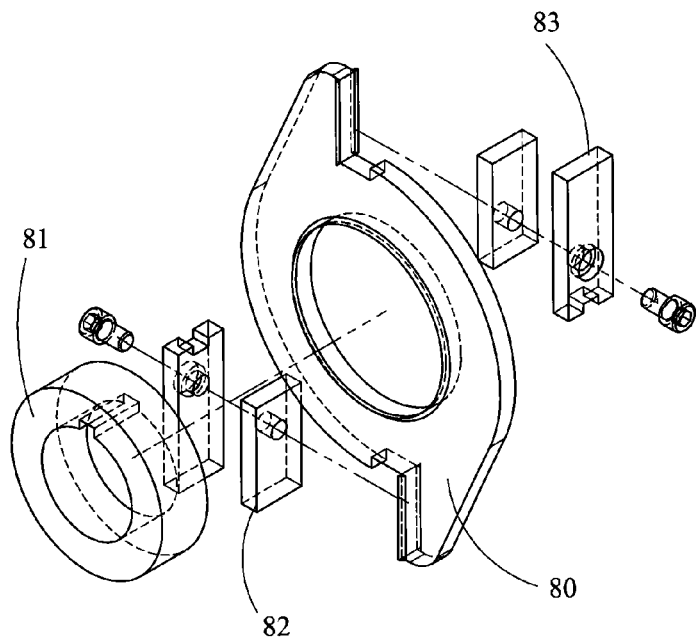
Figure 7:
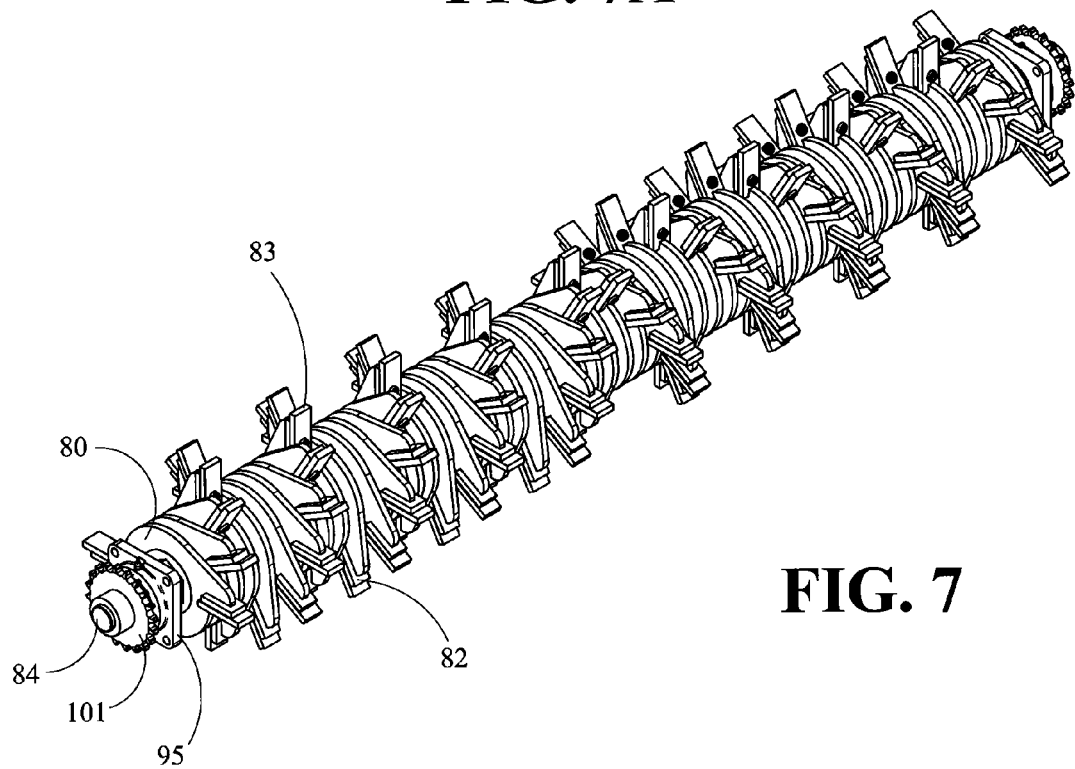
Figure 8:
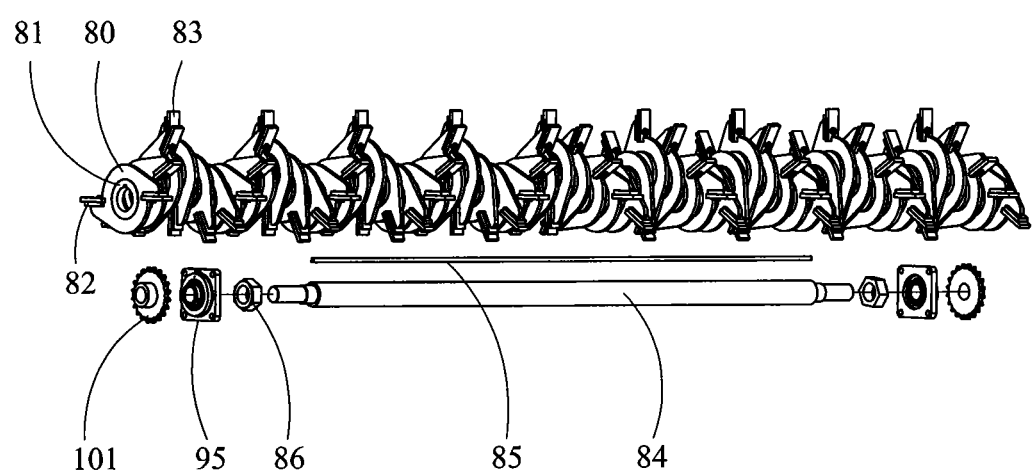
Figure 9:
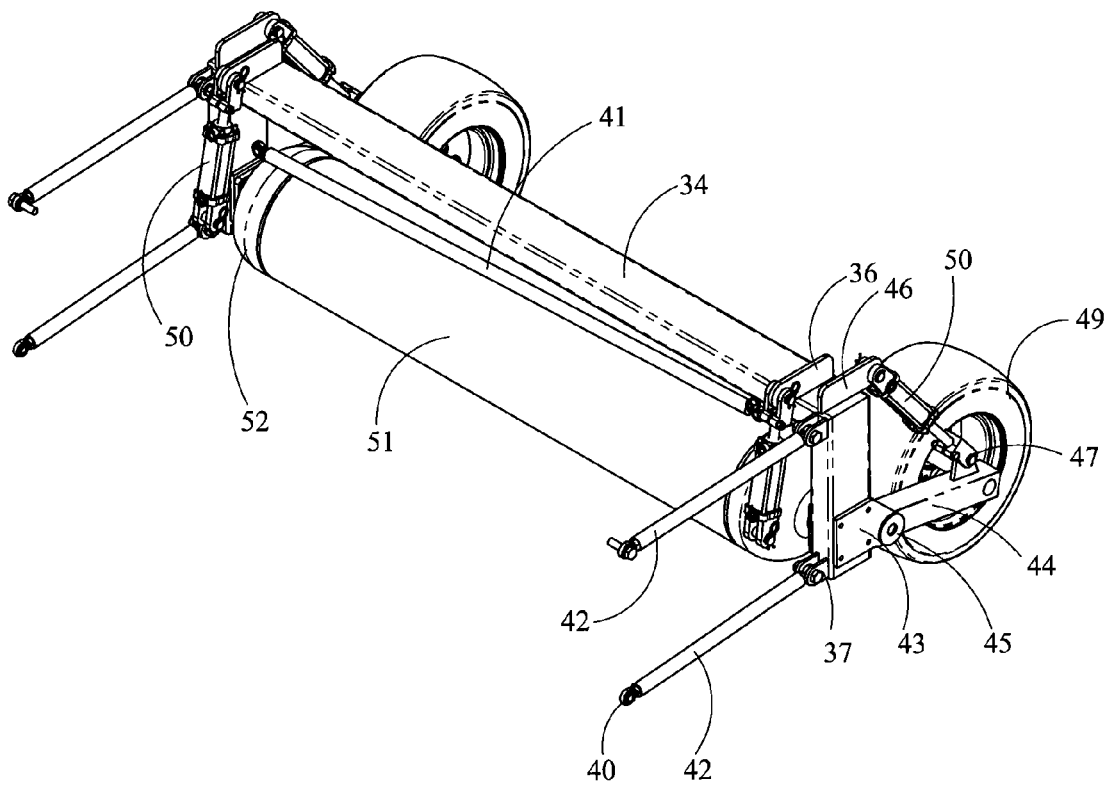
Figure 10:
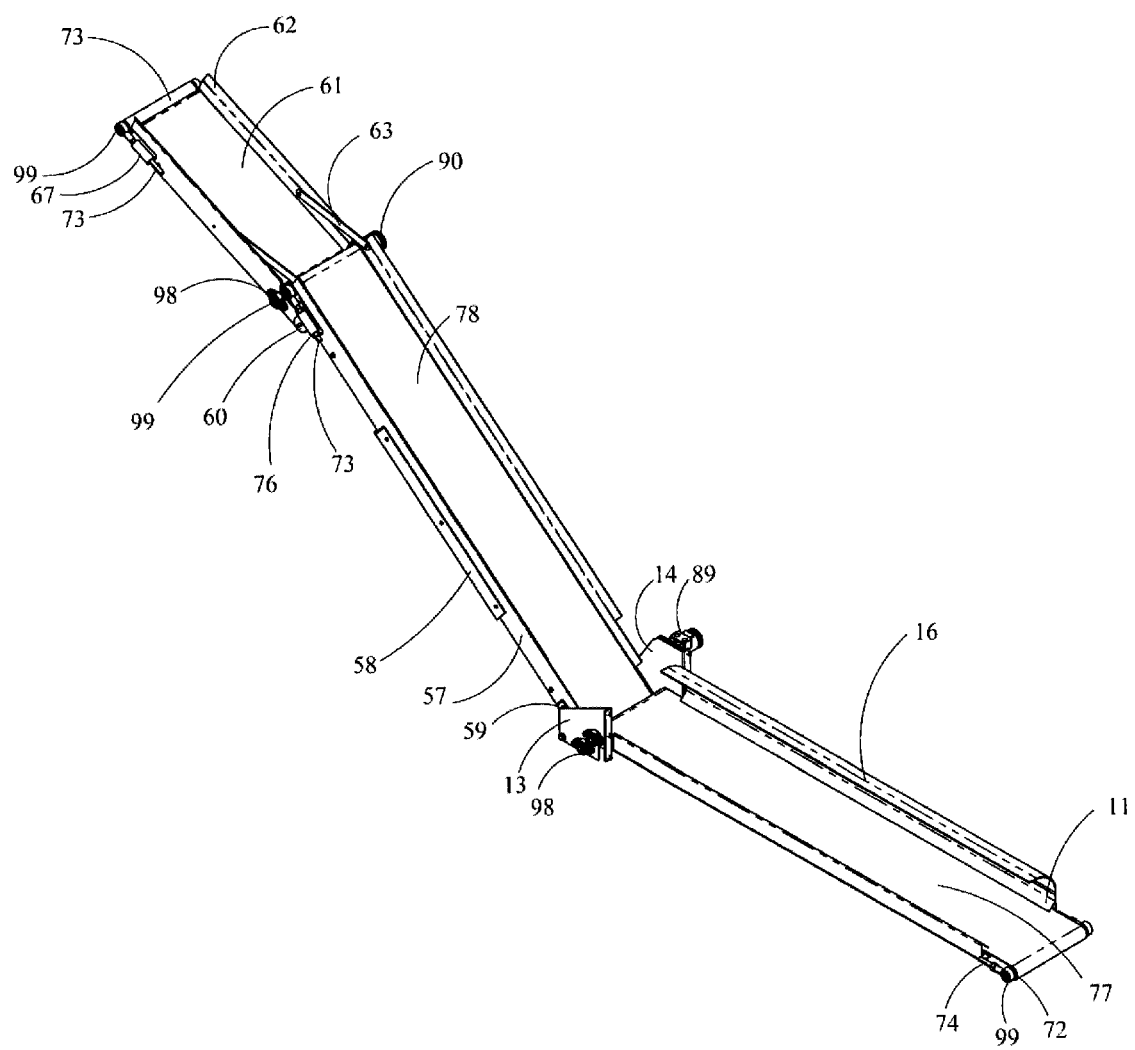

The cutter assembly will be described with particular reference to FIGS. 7, 7A and 8. The cutter assembly is attached to the frame. The cutting is accomplished by cutter teeth, 83. The cutter teeth are mounted on a cutter bracket, 80, with a cutter tooth mount, 82, preferably there between. The cutter bracket comprises an inner void for receiving a cutter bushing, 81. The cutter bushing is keyed the purpose of which will be more clear from further discussion. The inner voids of a series of cutter bushings are aligned and a cutter head shaft, 84, is received in the aligned inner voids. A cutter head keyway, 85, is received by the aligned key holes of the bushings. A cutter head nut, 86, on either end of the cutter head shaft secures the aligned and assembled cutters. The outer extent of the shaft is received by a cutter head bearing, 95, which is mounted to the side frames 1 and 2. As would be realized, the cutter rotation is preferably directly coupled to the PTO of the tractor through the gearing elements illustrated and described herein.

Figure 6:
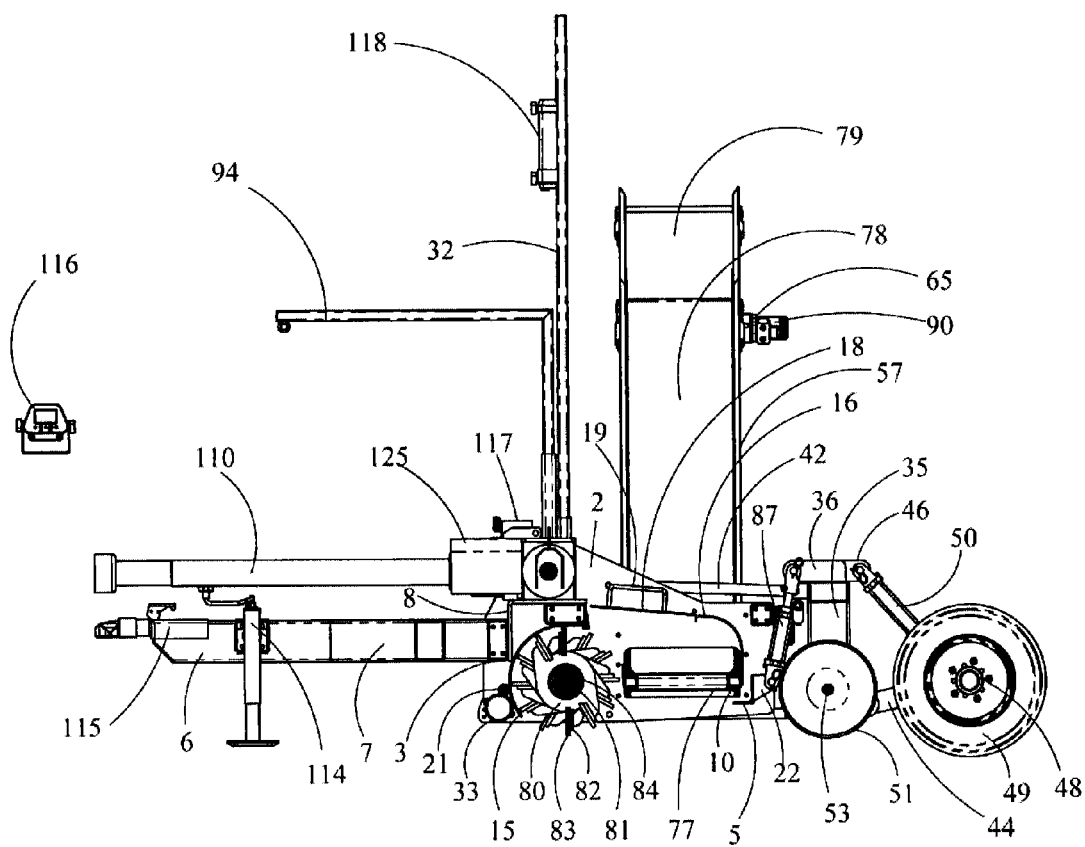

The cutters are preferably arranged in a helical fashion around the cutter head shaft. This provides an optimum cutting operation. It is preferred that the cutter rotate such that the cutter approaches the turf moving towards the direction of travel. In the present illustrations the cutter shaft would rotate clockwise as viewed from the left-hand side of FIG. 6. This direction of rotation is desirable for several reasons. One reason is an improved cut. Another reason is that the material removed by the cut is transported by the cutters and deposited on a conveyor which will be described further herein. Material is prohibited from falling to the front of the cutter by a front cutting head cover, 15, and associated brace, 21.

Figure 17:
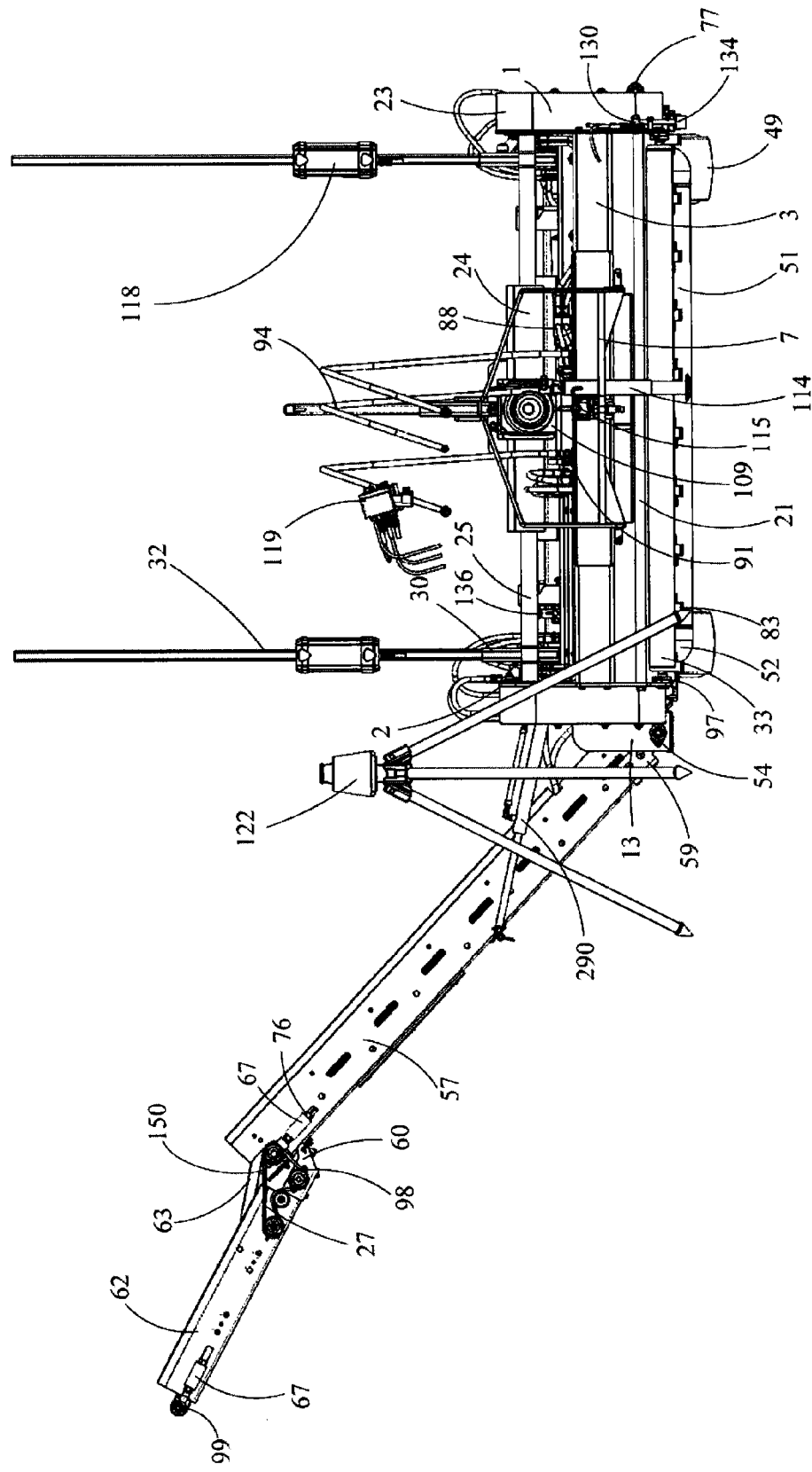
FIG. 17 is a front view of an embodiment of the turfplaner.
Figure 19:
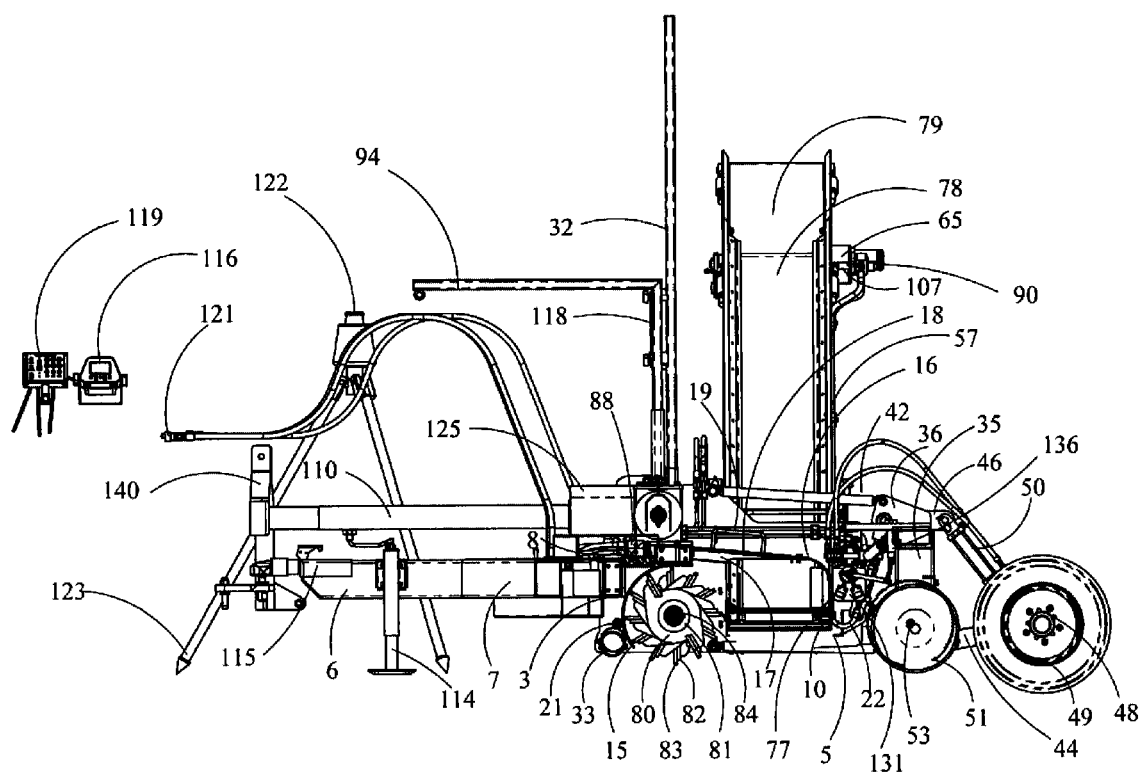
FIG. 19 is a partial cut-away view of the left hand side of an embodiment of the turfplaner.
Figure 20:
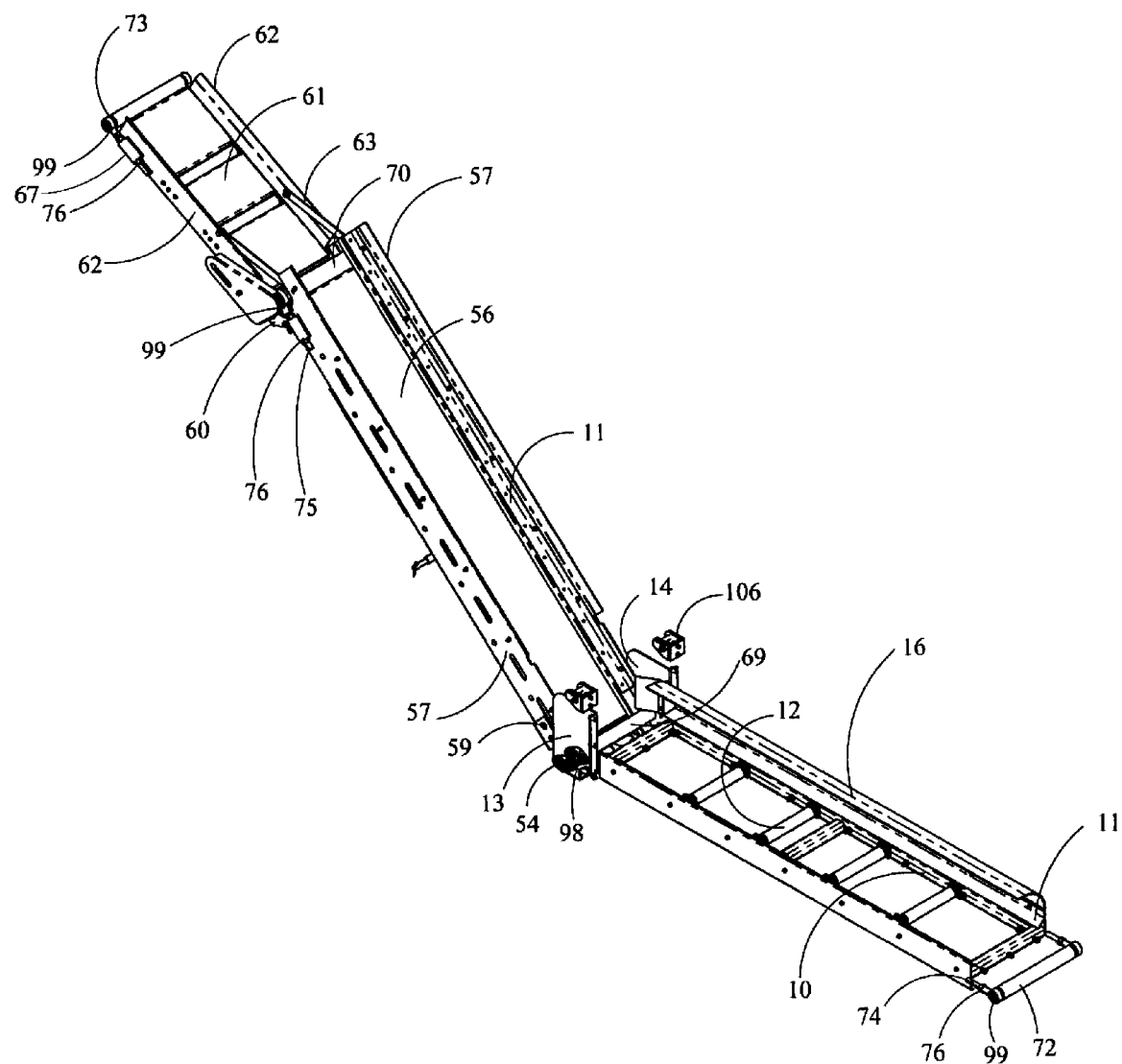
FIG. 20 is a perspective view of the conveyor of an embodiment of the turfplaner.

The conveyor assembly will be described with particular reference to FIGS. 1, 10, 17 and 20. The conveyor assembly is illustrated in isolation in FIGS. 10 and 20 and some of the belts are removed for clarity in FIG. 20. The conveyor comprises multiple continuous conveyor belts. For the purposes of the instant discussion the conveyor is described as being in three discrete units even though components could be combined or additional conveyor components added. The three components are referred to as the primary conveyor, which removes material from the interior of the turfplaner, an elevator conveyor which raises the material to a height sufficient to be dumped into a support vehicle, and an extension conveyor, which allows the tow vehicle to move beside the turfplaner at a safe distance. A primary conveyor belt, 77, preferably just behind the cutting assembly, transits material from the interior of the device and deposits the material on a conveyor elevator belt, 78, which then transports the material and deposits material on a conveyor extension belt, 79, wherein it is transported to a terminal area wherein it is preferably received by a support vehicle. A conveyor frame, (see FIG. 6), provides a support structure for the primary conveyor assembly with rollers, 12 and 69, there between. Primary conveyor belt, 77, is supported on one end by a conveyor idler roller, 72, which rides in a conveyor hanger bearing, 99, and on the other end by a conveyor drive roller (not visible) which is driven by a conveyor hydraulic motor, 89. In another embodiment the conveyors would be driven by coupling to the PTO through a gear and chain assembly or the like. The conveyor hanger bearing is attached to the frame by a conveyer hanger bearing rod, 74, which allows adjustment of the idler roller to insure the belt does not wander perpendicular to the idler roller during use. Opposite the conveyor idler roller, 72, the conveyor belt, 77, is supported and driven by a drive roller which is mounted in conveyor bearings, 98, and activated by a conveyor hydraulic motor, 89. Alternatively, a drive belt, 150, can be employed as illustrated in FIG. 17. A conveyor elevator cylinder bracket, 106, is illustrated in FIG. 20 which would be the point of attachment of a conveyor elevator cylinder (290 in FIG. 14). The conveyor belt is supported by a conventional conveyor bed plate (not shown). The conveyor bearings, 98, are secured to conveyer sides, 13 and 14. A conveyor deflector, 11, and rear conveyor cover, 16, insure that the material removed by the cutters remains on the conveyor belt. A conveyor cover, 18, with a handle, 19, for manipulating the cover is provided to prohibit material from leaving the conveyor and for aesthetics. An optional conveyor cover support angle, 17, is illustrated in FIG. 19.

The conveyor elevator transports material from the primary conveyor to the conveyor extension. The conveyor elevator comprises a conveyor elevator frame, 54 (see FIG. 12), and a conveyor elevator bed, 56, which supports the conveyor elevator belt, 77. The conveyor elevator has sides, 57, and a belt guard, 58, for safety and to prohibit material from falling from the belt. The conveyor elevator frame is mounted by a conveyor elevator pivot bracket, 59, which is attached to conveyor mounting plates, 29. The conveyor elevator belt is strung on a conveyor elevator idler roller, 73, which is attached by a conveyor elevator hanger bearing rod, 67, and aligned by a conveyor adjuster nut, 76. A second conveyor hydraulic motor, 90, provides rotational power to the elevator belt through a drive roller, 65. The conveyor hydraulic motor, 90, may be attached through a coupler as illustrated at 107 of FIG. 19. In one embodiment a single hydraulic motor can be employed yet two are preferred for enhanced control.

Figure 1:
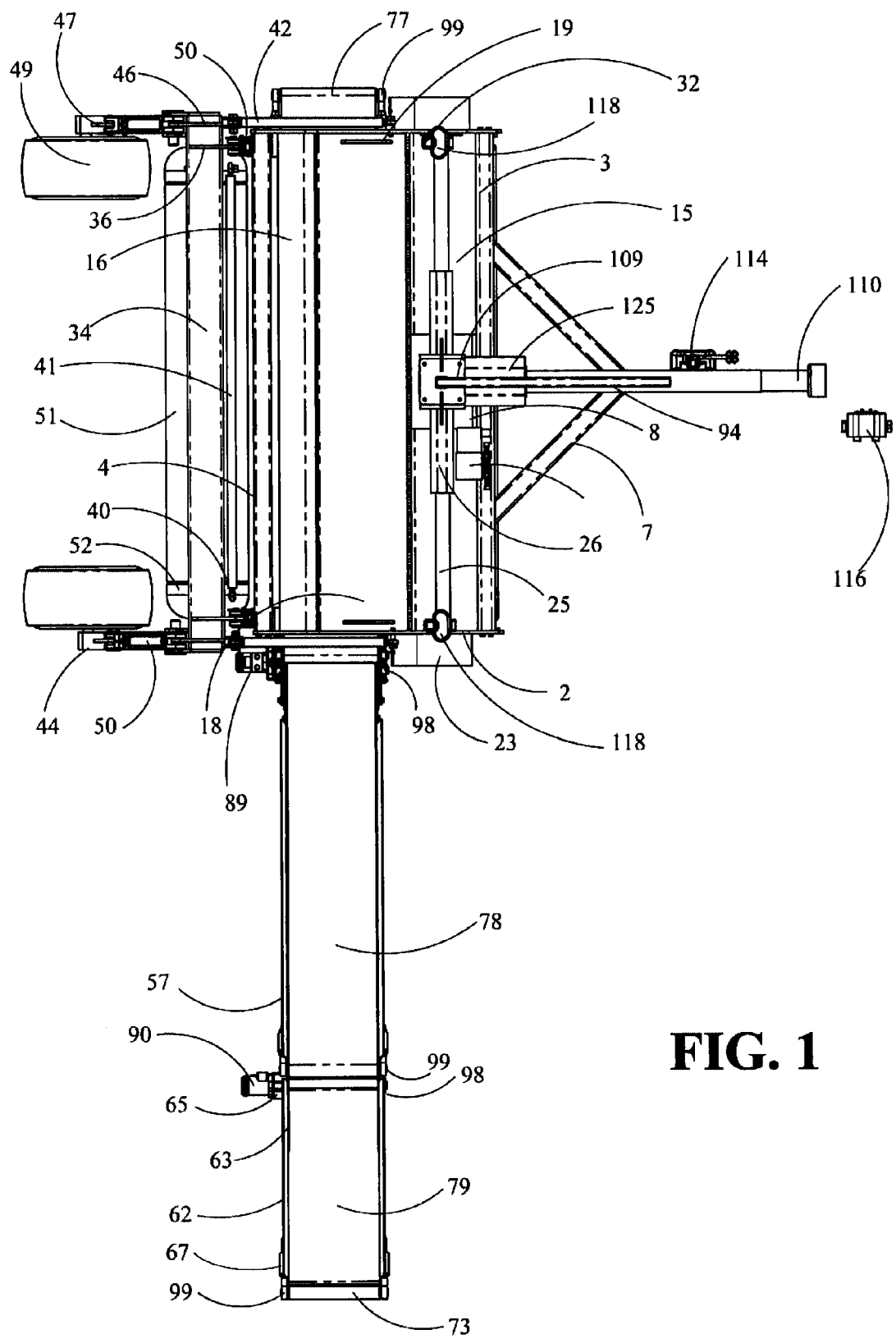
Figure 2:
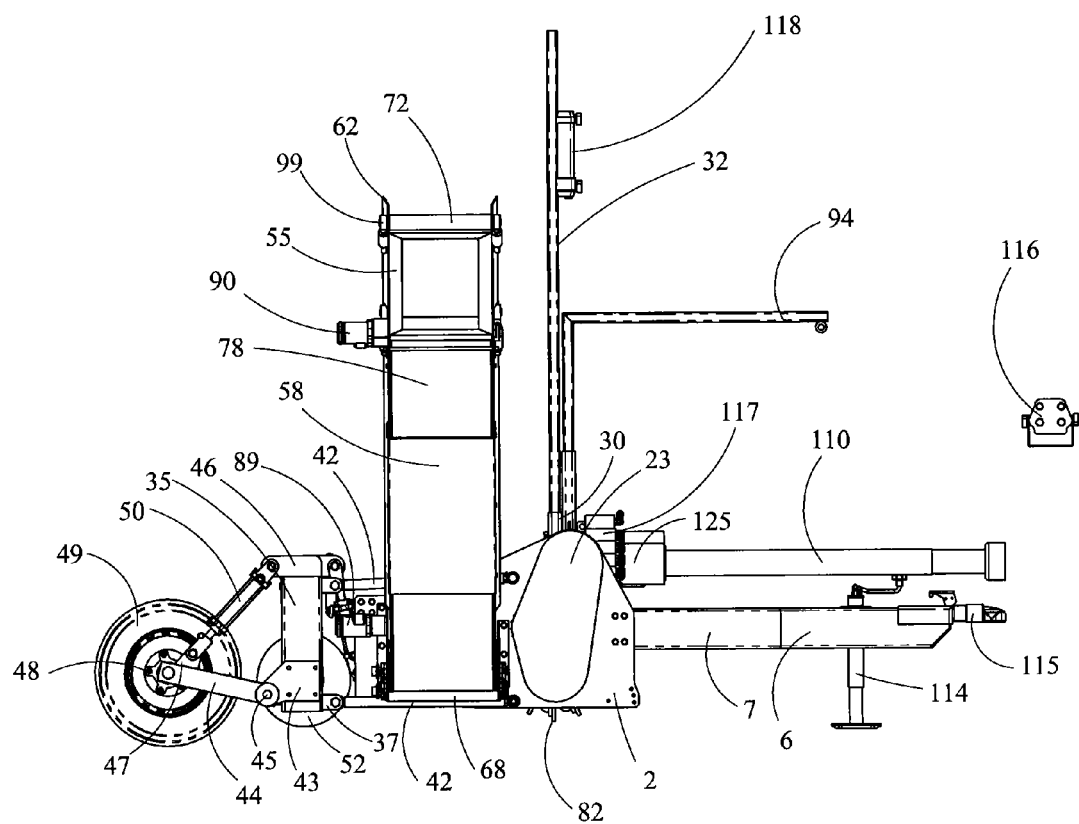
Figure 3:
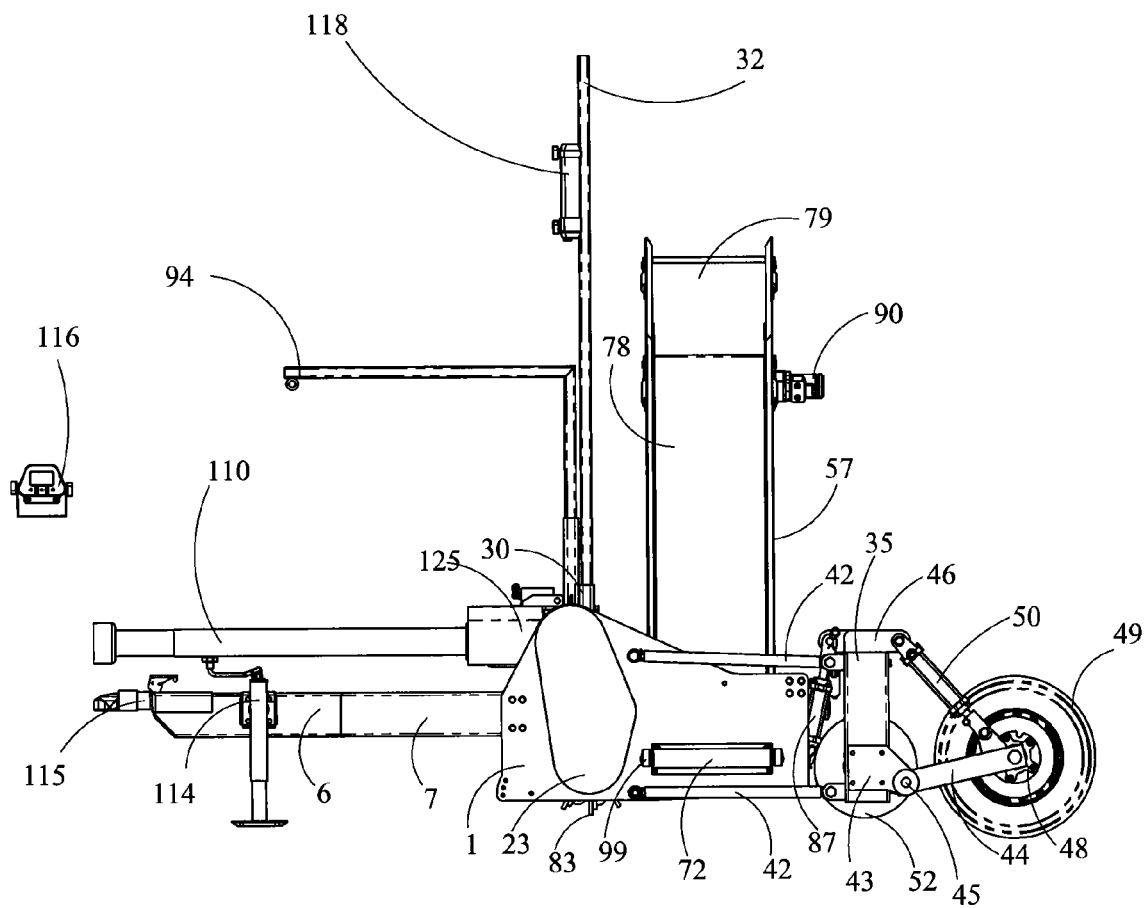
Figure 4:
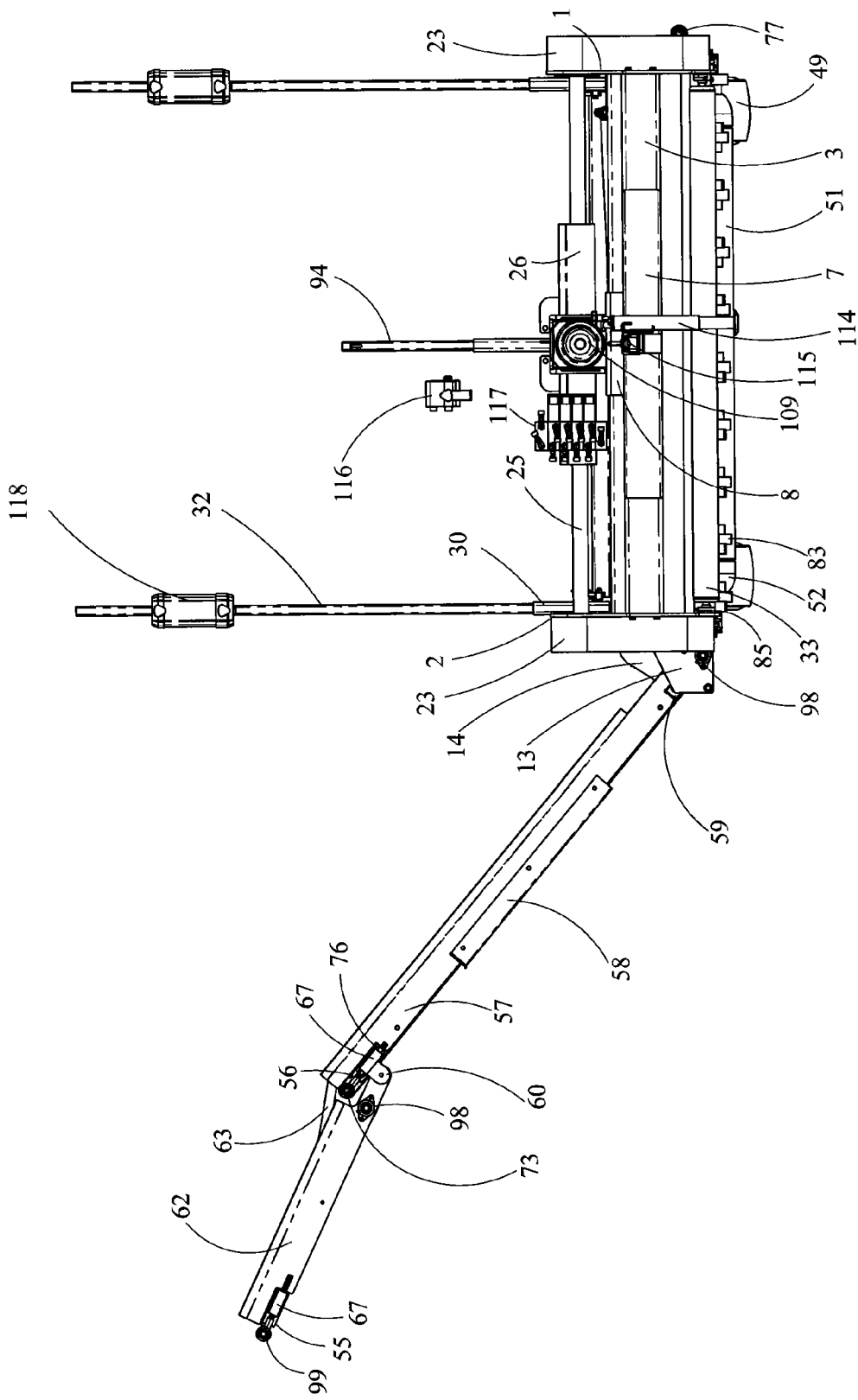
Figure 5:
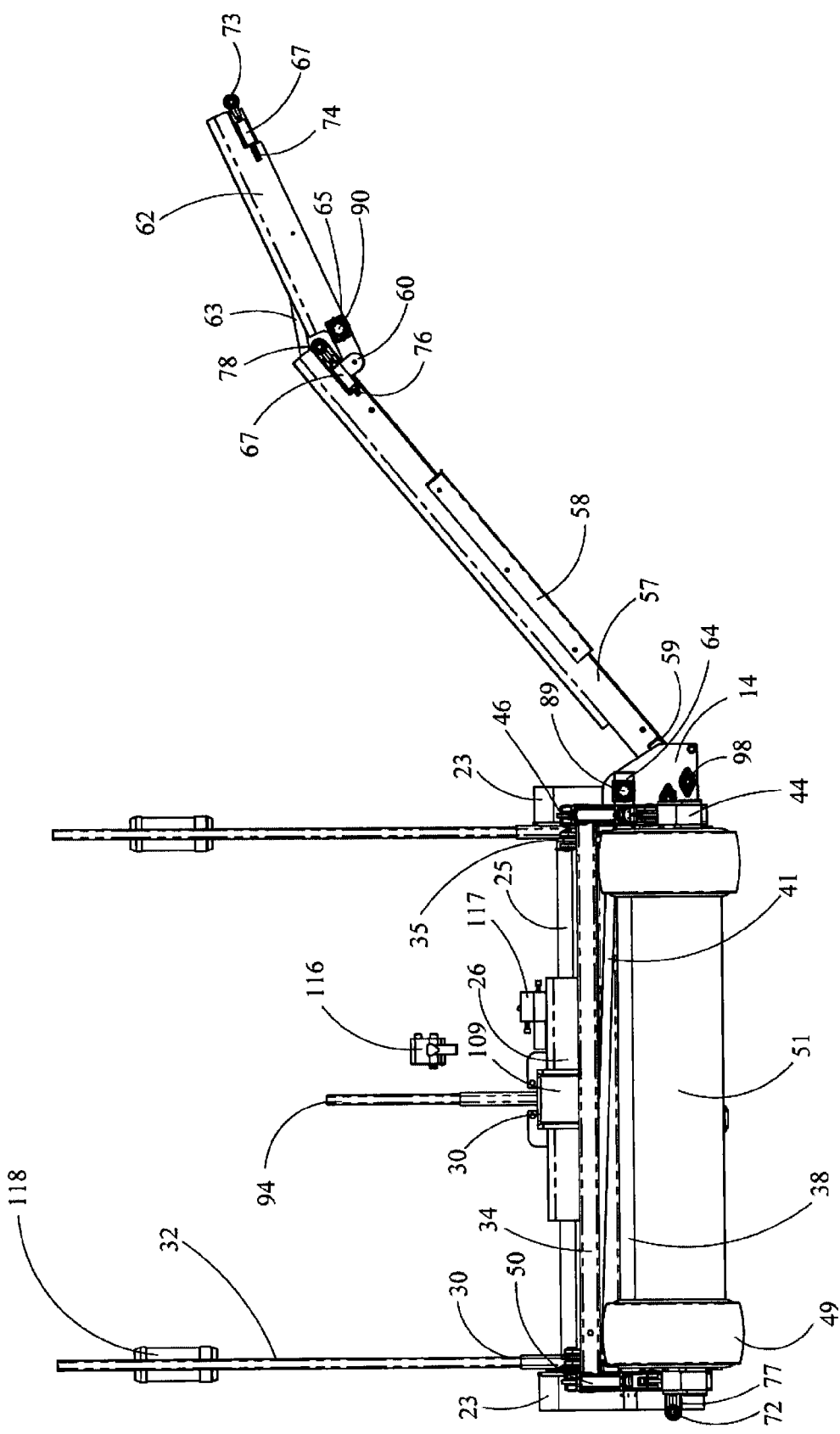

The conveyor extension is mounted to the conveyor elevator at a conveyor extension pivot bracket, 60. The conveyor elevator has a conveyor extension bed, 61, for supporting the conveyor elevator belt and is bound on the sides by conveyor extension sides, 62. Conveyor extension supports, 63, are preferably provided if necessary, all supported by a conveyor extension frame, 55 (see FIG. 2). A conveyor elevator spacer, 68, is provided if necessary to avoid insufficient clearance between components and, particularly, between belts rotating in non-synchronized fashion.

A transport assembly is provided, preferably, at the rear of the turfplaner. The transport assembly comprises wheels for inoperative transport and a roller which is operational during planing. The transport assembly will be described with particular reference to FIGS. 1-3, 5, 6, 9 and 12. The transport assembly comprises a roller frame top, 34, and roller frame sides, 35, generally in the form of an inverted "U" which, taken together, comprise the main frame. A cylinder roller bracket, 36, is mounted on the roller frame top. A transport hydraulic cylinder, 50, connects the cylinder bracket roller frame, 36, to a roller tankhead, 52, which functions to lower and raise the roller pipe, 51, into and out of engagement with the ground. The roller pipe, 51, is mounted on a roller shaft, 53, which is attached on either end to the roller tankhead, 52. A roller suspension frame mount, 37, on either side attached to the roller frame side, 36, connects the lower extent of the transport assembly to the frame sides, 2 and 3, through upper and lower suspension links, 42, via a suspension link tie rod, 40. A suspension sway link, 41, is preferably provided to mitigate improper tracking. Transport wheels and tires, 49, are attached to the roller frame sides, 35, through a transport leg, 44, which receives an axle. The wheel is attached to the axle by a transport spindle and hub, 48. The transport leg is attached by a transport pivot pin, 45, at a transport pivot bracket, 43, on the roller frame side. A transport hydraulic cylinder, 50, spanning between a transport cylinder top bracket, 46, on the frame and a transport cylinder bottom bracket, 47, on the transport leg, 44, rotates the wheel into and out of engagement with the ground. A roller scraper, 38, removes any material adhering to the scraper thereby providing a continuous smooth scraper surface. The roller scraper is preferably attached to the roller tankhead, 52, by roller scraper mounts, 38. During use the roller is in engagement with the ground and functions to smooth any undulations remaining from the cutter. During transport the roller is not engaged and the turfplaner is transported on the wheels.

A particular feature of the instant invention is the laser guidance system which is coupled with the hydraulics to maintain the cutter of the turfplaner in a perfectly level orientation relative to the laser beam. In prior art methods the leveling is typically dictated by a monitor based on gravity, such as a bubble level, on the machine. Each pass is therefore uncorrelated to the previous pass with regards to depth of cut. With the present invention a laser with a planar light is set up preferably beyond the location being leveled. Sensors on the turfplaner detect if they are above or below the planar light and adjust the cutter accordingly during use. Therefore, the cutter is maintained in a level orientation and each pass across an area is correlated in identical fashion to the laser. The result is a finished area which is nearly perfectly level relative to the laser after a single pass. Furthermore, the direction of travel is not relevant. Regardless of where the turfplaner is located the cutter can be maintained in a level orientation relative to the planar fan beam as long as the planar laser light can be received.

Laser proportional receivers, 118, are slidably attached to a laser mast, 32, which is attached to the turfplaner frame by a laser mast mount, 30. The laser mast mount is attached to the turfplaner to move in concert with the cutter as would be realized from the description herein. A laser control, 116, is preferably situated in a convenient location such that the laser proportional receivers can receive the beam from the laser control over the entire area being planed. The laser proportional receivers are then slid on the laser mast and fixed. The distance between the laser proportional receiver and cutter is therefore fixed and the height of the cutter is adjusted to maintain the laser proportional receiver at the same level as the laser control.

Figure 13:
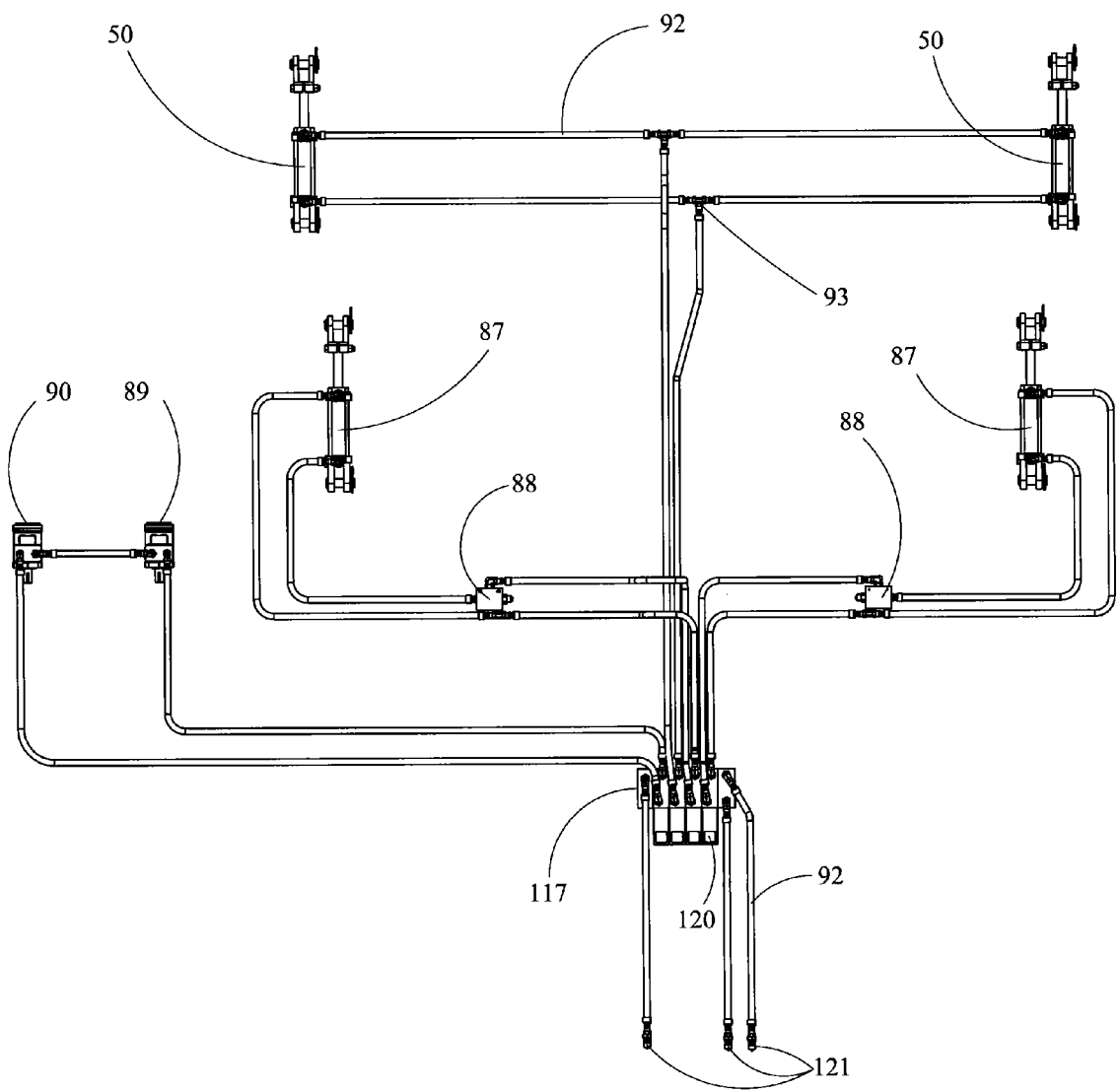
Figure 23:
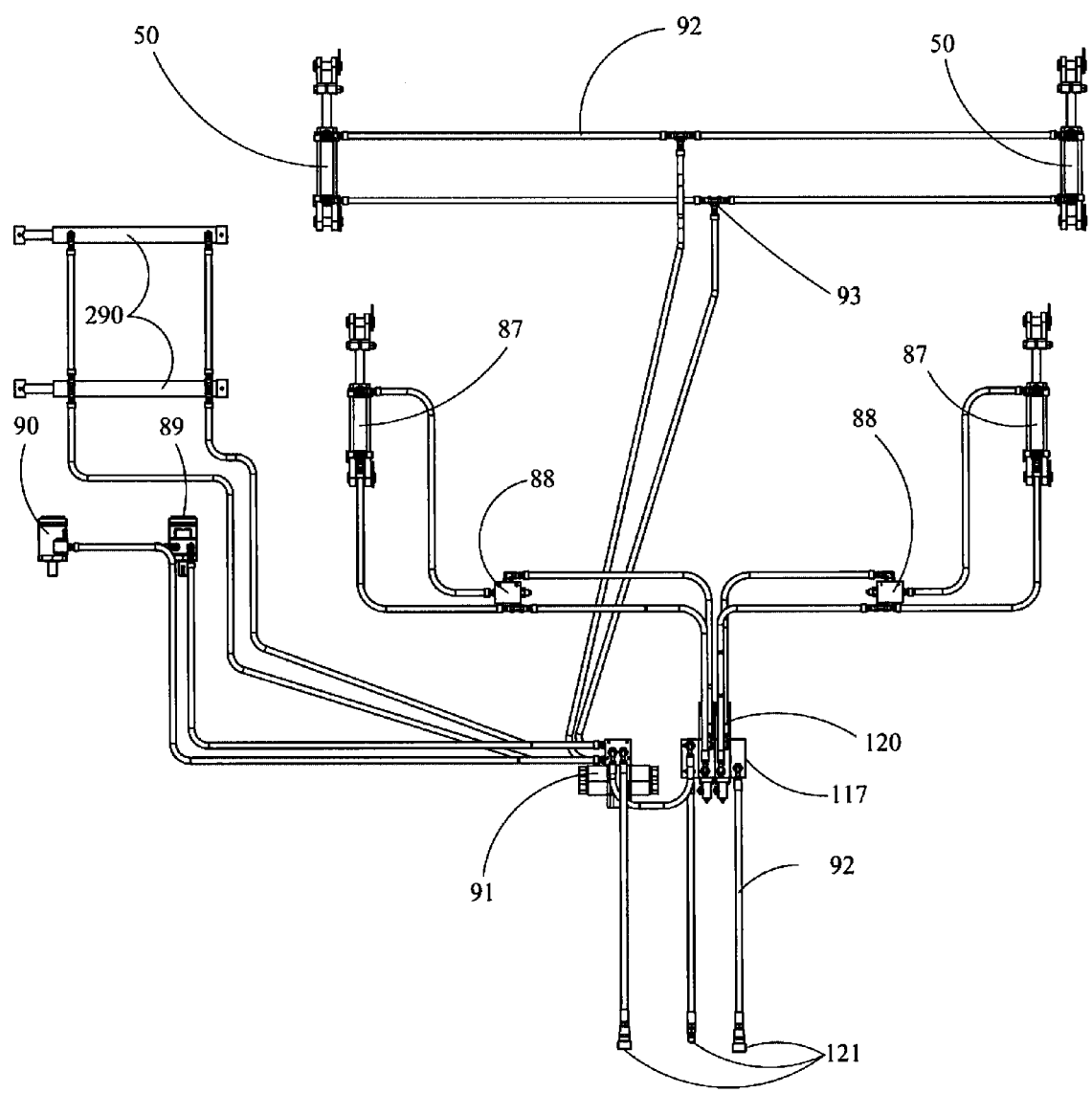
FIG. 23 is a view of the hydraulic control system of an embodiment of the turfplaner.

The cutter, transport assembly, and conveyors are preferably all controlled by a common hydraulic system which is illustrated in isolation in FIGS. 13 and 23. Laser hydraulic proportional valves, 117, react in a subservient manner to a laser electric solenoid, 120, to control the height of the cutting head. The hydraulic system for the turfplaner is preferably subservient to the hydraulic system of the tractor and supplied through hydraulic hoses, 92, with appropriate junctions, 93, attached to the tractor hydraulic system through standard tractor hydraulic connectors, 121. The conveyors are manipulated by the conveyor hydraulic motor, 89, and conveyor elevator hydraulic motor, 90. The machine control hydraulic cylinders, 87, attached to a bracket, 22, control the height of the cutter relative to the roller pipe, 51, with a hydraulic counterbalance valve, 88, located in each circuit for control purposes as would be readily understood. The transport assembly is manipulated by the transport hydraulic cylinder, 50, conveyor hydraulic motor, 89, and conveyor elevator hydraulic motor, 90. A hydraulic triple control valve, 91, can be used to control conveyor lift hydraulic cylinders, 290. The hydraulics can be controlled manually by a manual valve control or the hydraulics could be computer controlled.

In some instances absolute planarity is not desired but, instead, the desire is to conform an adjacent area to existing structure such as a sidewalk, drive surface, curb, aesthetic surface or the like. For example, in the case of a sports field within a track it is highly desirable to provide an autograding device to avoid any deviation from the level of the track and the playing surface adjacent thereto. It would be most desirable to have the first pass of the turfplaner match the level of the track at the interface with the track and have a smooth transition from the interface to the side of the turfplaner furthest from the track. A path the width of the turfplaner would therefore represent a slope, relative to a perpendicular to the track, which is predetermined. The side of the turfplaner opposite the track may be controlled by a laser, as described above, or an autodepth device may be employed, as will be more fully described herein. In subsequent passes the autograding can be used to match the contour of a previous pass and the other side of the turfplaner can be controlled by a laser or an autodepth device.

Figure 14:
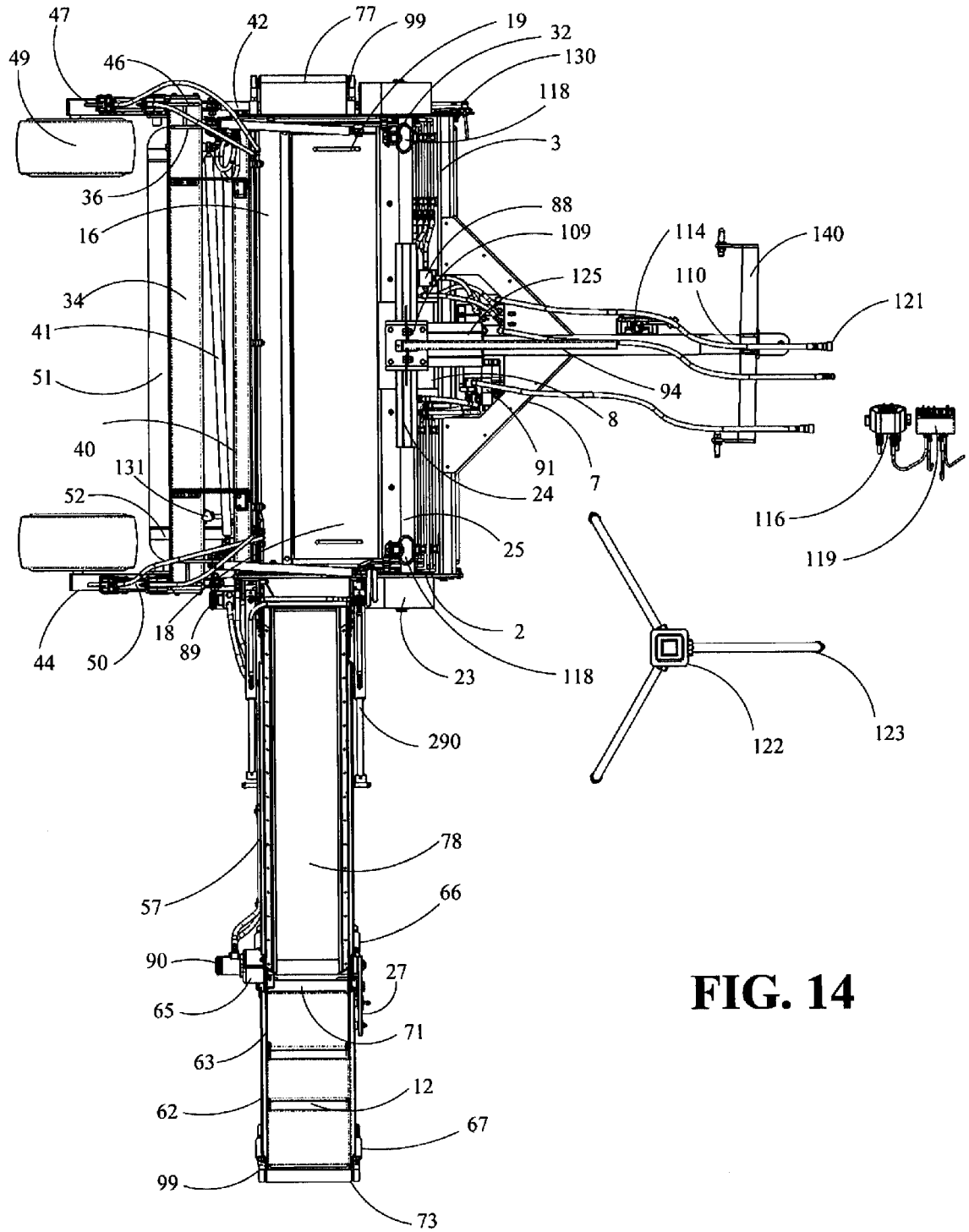
Figure 15:
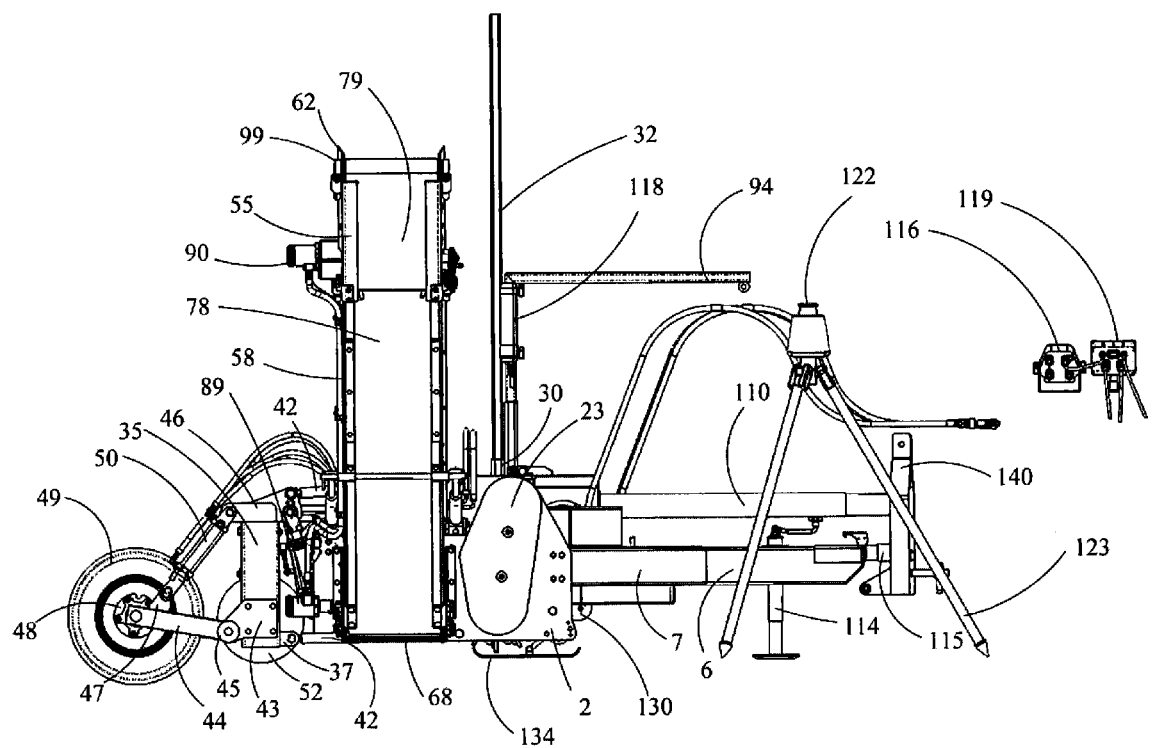
Figure 16:
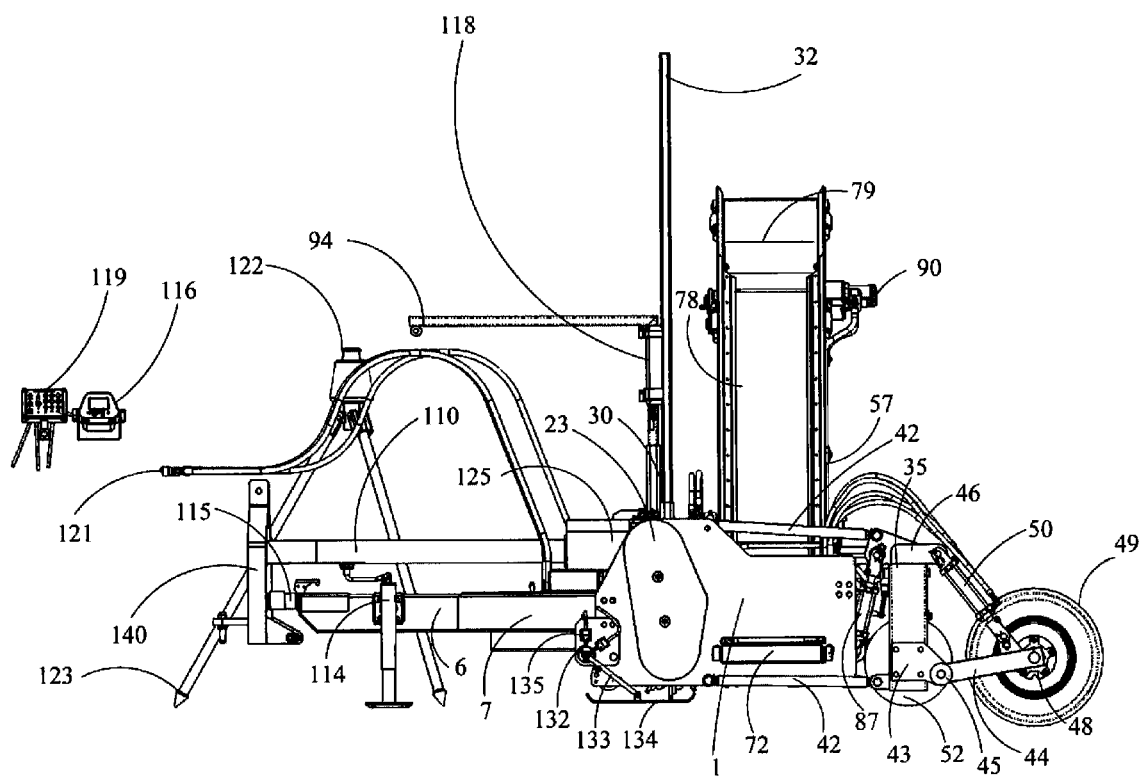
Figure 18:
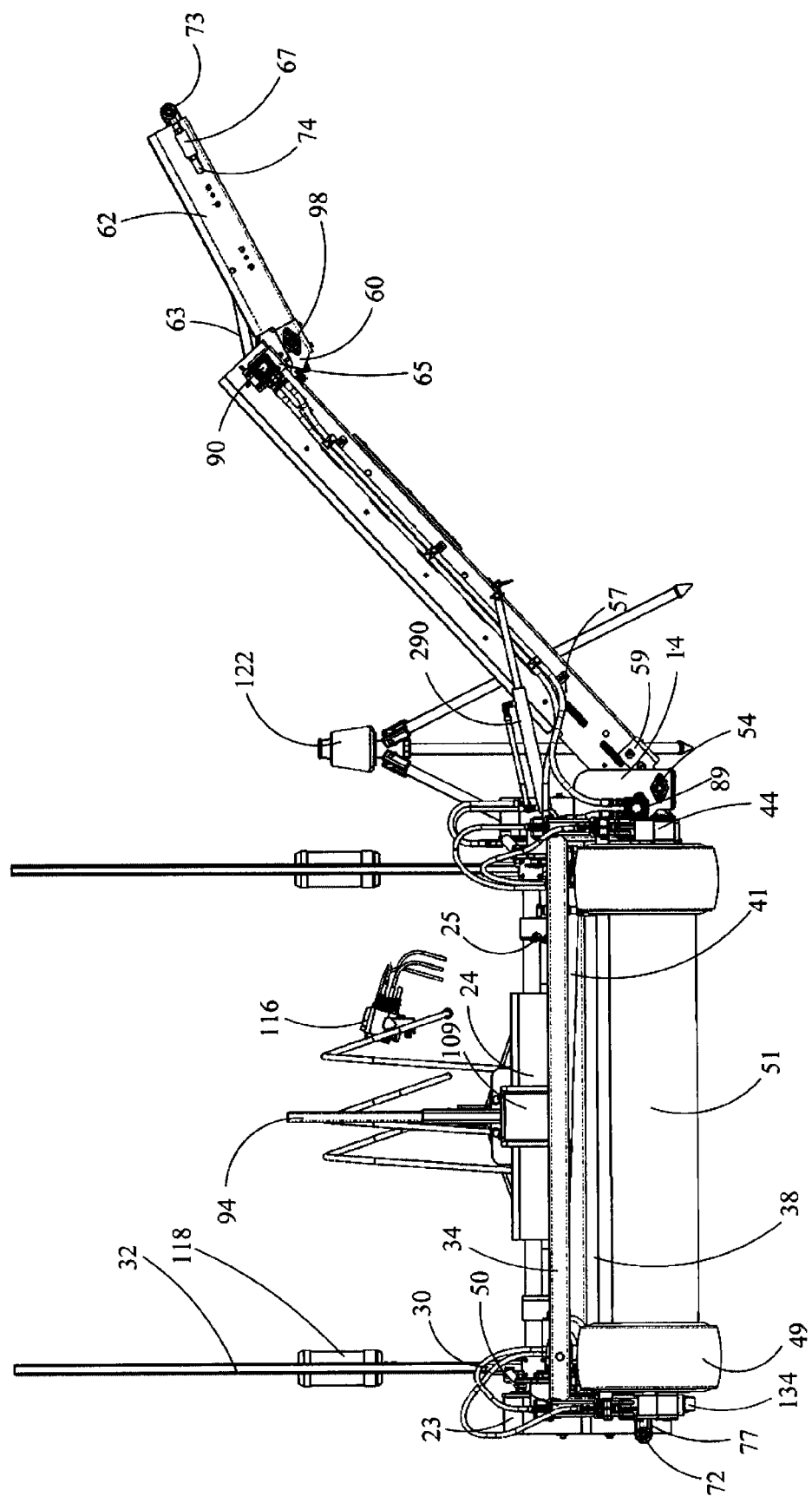
FIG. 18 is a rear view of an embodiment of the turfplaner.

An embodiment of the turfplaner is illustrated in top view in FIG. 14, in side view in FIGS. 15 and 16, in front view in FIG. 17 and rear view in FIG. 18. A conveyor lift hydraulic cylinder, 290, provides for hydraulic lifting of the conveyor. A slope/cone laser, 122, and preferred tripod, 123, provide a planar laser signal which is received by the laser proportional receiver(s), 118, when lasers are used. A turfplaner controller, 119, controls the device by monitoring a combination of laser proportional receivers, autograde sensors and autodepth sensors with appropriate signal to the hydraulics to maintain the turfplaner at the proper level on each side. A 3-point hitch adapter, 140, allows the device to be easily integrated with the typical three-point hitch system of a tractor. The autograde device, 130, and autodepth device, 131, will be described in more detail below.

Figure 24:
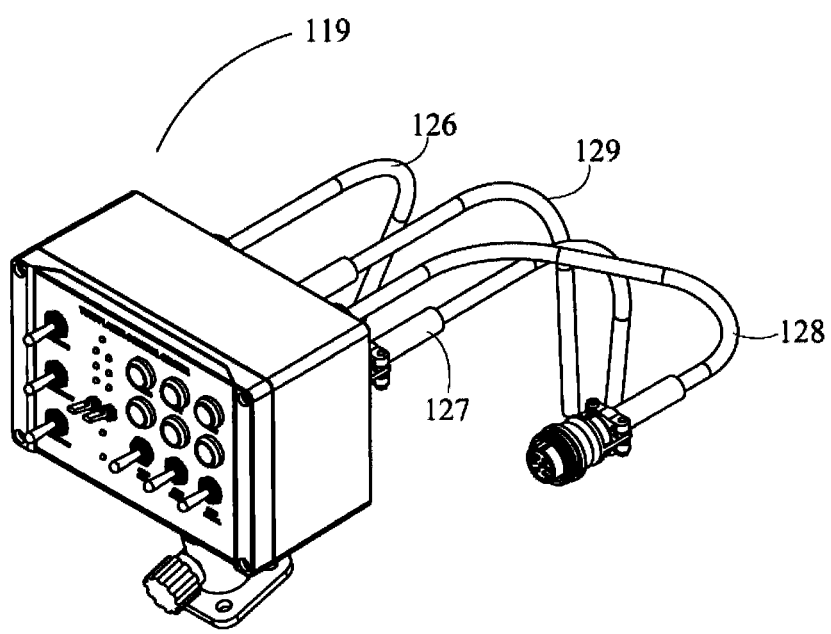
FIG. 24 is a view of the master control system of an embodiment of the turfplaner.

An embodiment of the turfplaner controller, 119, is illustrated in isolated view in FIG. 24. In FIG. 24, the turfplaner controller has a power cable, 126, for providing power to the controller. A sensor cable, 127, receives signals from the various sensors. Cables 128 and 129 are interface cables with one interface to the laser control and one interface to the control valves of the hydraulic cylinders.

Figure 25:
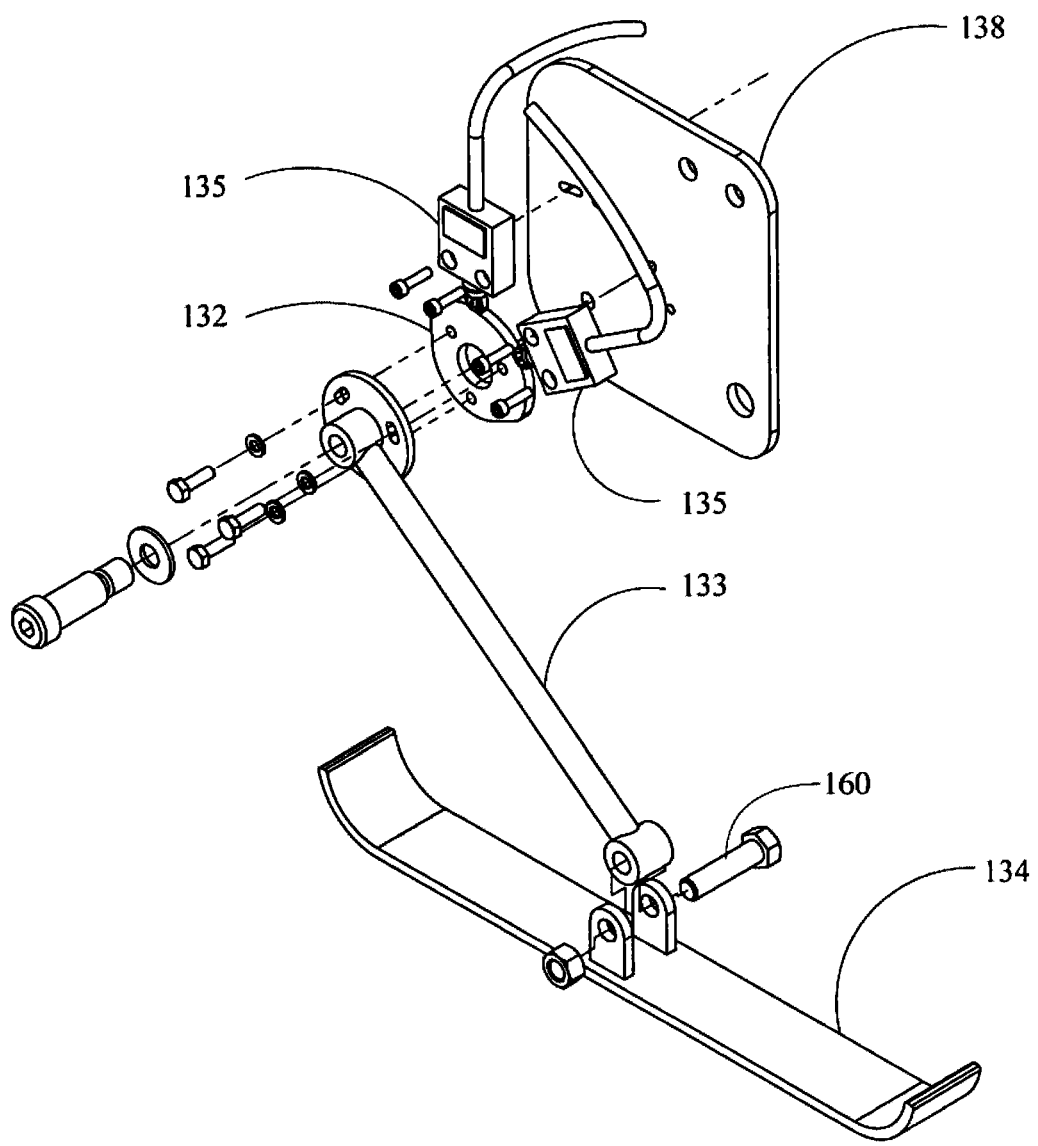
FIG. 25 is an exploded perspective view of an embodiment of the autograde of the turfplaner.

An embodiment of the autograde device is illustrated in perspective exploded view in FIG. 25. An autograde mounting bracket, 138, affixes the autograde device to the turfplaner preferably in a position to be near the edge of the most outbound cutter on the side opposite the conveyor. The autograde skid, 134, rides along existing structure the contour of which is to be mimicked by the adjacent surface being planed. The length of the autograde skid is chosen to be sufficiently long to traverse minor alterations, such as expansion joints, without alteration yet not so long as to traverse intentional contours. It is preferable that the autograde skid be at least about 15 cm (about 6 inches) to no more than about 61 cm (about 24 inches). Below about 15 cm minor undulations such as expansion joints or variations in the height of adjacent bricks may be realized. Above about 61 cm aesthetic contours may be artificially truncated. The autograde skid preferably has upturned ends to insure that the skid rides on the surface. The autograde skid is mounted to an autograde link, 133, preferably with a pivot mount such as mating threaded members, 160, or the like. The autograde link is attached to, or integral to, an autograde cam, 132, which upon rotation activates at least one autograde microswitch, 135. The autograde microswitch relays alterations in contour to the turfplaner controller, 119, which activates the appropriate hydraulics to maintain the cutting head at the proper height. In the illustrated embodiment the autograde link is attached to the autograde cam by threaded members and associated washers as would be readily understood, however, any method of coupling movement of the autograde skid to a sensor would be considered within the scope of the invention.

Figure 26:
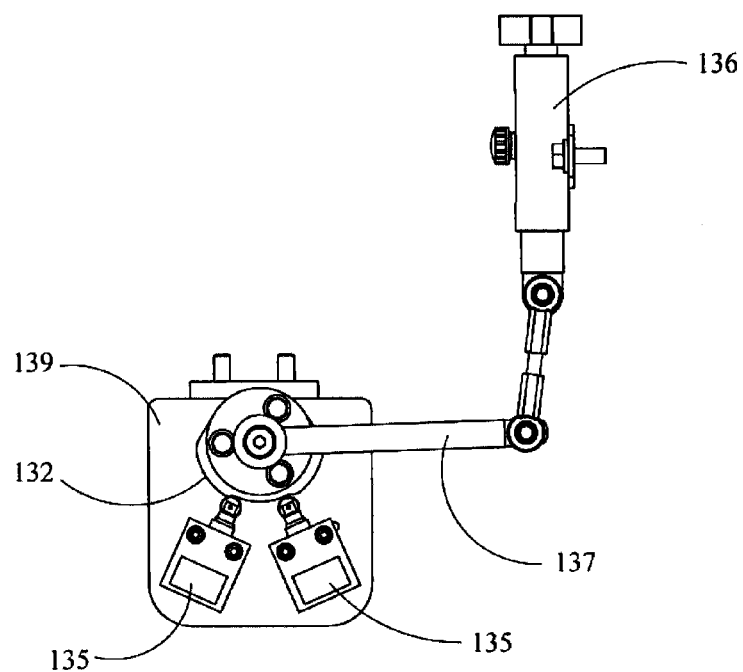
FIG. 26 is a side view of an embodiment of the autodepth control of the turfplaner.
Figure 27:
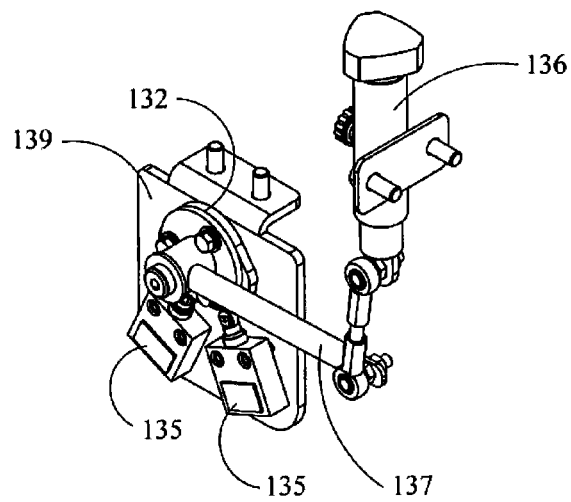
FIG. 27 is a perspective view of an embodiment of the autodepth control of the turfplaner.

An embodiment of the autodepth device is illustrated in side view in FIG. 26 and perspective view in FIG. 27. An autodepth adjuster, 136, fixes the desired height difference between itself and an autodepth bracket, 139, which is attached to a portion of the turfplaner which moves in concert with the roller pipe (52 of FIG. 15). As the autodepth bracket moves up and down relative to the autodepth adjuster, 136, an autodepth cam, 132, interacts with autodepth micro switches, 135. The autodepth micro switches send a signal to the turfplaner control which activates the appropriate hydraulics thereby returning the height of the cutter to the appropriate level.

The embodiment illustrated has a conveyor which is in a fixed orientation relative to the direction of travel for the turfplaner. Other embodiments are envisioned with the conveyor being capable of discharging from either side, the front or the back. A conveyor which rotates relative to the direction of travel is considered within the scope of the invention yet this is less desirable due to cost considerations. It is most preferable that the direction of travel be such that the conveyor discharges away from previously planed areas. This arrangement is preferable since it is desirable to avoid spillage of discharged material onto previously planed areas and it is desirable to not have transport vehicles on previously planed areas. It is most preferred that the autograde device be on the side opposite the conveyor since the grade being mimicked is typically an aesthetically pleasing or functional area and it is therefore desirable to avoid spillage and traffic thereon. Though an autograde device could be on both sides this is undesirable since the redundant devices increases cost and is typically not necessary. Similarly, the autodepth device is preferably on the side of the conveyor. Though an autodepth device could be on both sides this is undesirable since the redundant devices increases cost and is typically not necessary.

The instant invention provides significant flexibility. The depth or height of the cut on either side is independent of the other. One side can be controlled by an autograde device or a laser and the other side can be controlled by an autodepth device or a laser. Each pass of the machine across an area can be accomplished using different combinations of laser, autodepth and autograde to provide an area which is contoured to a specified predetermined shape. As would be realized the cutting height can be manipulated by manual control if desired.

Various components of the turfplaner are illustrated which are not specifically recited herein. Specifically, various covers, brackets, bushings, spacers, supports, etc. which would be included for structural strength, aesthetics or to avoid contact between various components are not specifically called out but are set forth in the figures and would be readily understood to be a design choice by one of skill in the art.

The instant invention is particularly suitable for any application wherein the planarity of an area is of utmost concern. The present invention can also be used to crown, or slope, areas with great precision by setting the two laser proportional receivers at different heights representative of the desired slope there between or through the use of the autograde or autodepth devices. Alternatively, each laser proportional receiver can be the same distance from the cutter and the laser fan can be tilted relative to gravity to provide a predetermined slope.

The present invention eliminates multiple passes to level an area or to make the area coplanar with an adjacent area. In practice, the invention can provide a surface which is level within 1/16 of an inch. This is previously unobtainable with prior art technologies, especially, in a single pass.

A particular application is in weed control. Some grasses, such as Bermuda grass, have a root system which is well below the surface of the ground. Therefore, the current invention can be used to scalp the surface down to a level which is above the root system of the grass or similar vegetation. Any weed, or unwanted vegetation, which has a shallow root system will be removed and the grass will quickly rise from the roots up through the surface. This provides a system for removing weeds and unwanted vegetation without chemicals. Furthermore, the area can be leveled and deweeded in a single pass.

The invention has been described with particular reference to the preferred embodiments without limit thereto. One of skill in the art would readily realize additional embodiments, alterations and improvements which are not specifically enumerated herein but which are within the scope of the invention as specifically set forth in the claims appended hereto.

The invention claimed is:

1. A turfplaner system comprising:
a device capable of being transported over an area wherein said device comprises:
a rotational elongated cutter comprising a first side and a second side; and
a control mechanism capable of independently altering a height of said first side of said rotational cutter and said second side of said rotational cutter relative to a predetermined height over said area; and, the turfplaner system further comprising an autograde device wherein said autograde device follows a preexisting contour and said turfplaner adjust a first side height of said first side of said rotational cutter to mimic said preexisting contour.

2. The turfplaner of claim 1 wherein said autograde device comprises an autograde skid capable of engaging with said preexisting contour and moving in concert with changes in said preexisting contour.

3. The turfplaner of claim 2 further comprising a controller capable of raising or lowering said first side of said rotational cutter in response to said moving in concert with said changes in said preexisting contour.

4. The turfplaner of claim 2 wherein said autograde device comprises a cam which rotates in response to said moving in concert with said changes in said preexisting contour.

5. The turfplaner of claim 4 wherein said autograde device comprises at least one detector which detects said rotation of said cam.

6. The turfplaner system of claim 1 wherein said turfplaner further comprises a pipe roller.

7. The turfplaner system of claim 6 further comprising an autodepth device wherein said autodepth device maintains said second side of said rotational cutter at a predetermined depth of cut relative to said pipe roller.

8. The turfplaner system of claim 1 further comprising a conveyor for removing said material.

9. The turfplaner system of claim 8 wherein said conveyor comprises at least one of an elevator conveyor and an extension conveyor.

10. The turfplaner system of claim 1 further comprising a transport assembly.

11. The turfplaner system of claim 1 further comprising a laser capable of emitting a planer light.

12. The turfplaner system of claim 11 further at least one receiver capable of receiving said planer light.

13. The turfplaner system of claim 12 comprising a system for raising and lowering at least one of said first side of said cutter or said second side of said cutter relative to said planar light.

14. The turfplaner system of claim 13 wherein said system is a hydraulic system.

15. A method for leveling an area comprising:
providing a device capable of being transported over said area wherein said device comprises:
a rotational elongated cutter comprising a first side and a second side; and
a control mechanism capable of independently altering a height of said first side of said rotational cutter and said second side of said rotational cutter relative to a predetermined height over said area; and
moving said device over said area wherein when said device is transported over
said area said cutter removes any material above a fixed distance below said predetermined height.

16. The method for leveling an area of claim 15 wherein said turfplaner further comprising an autograde device wherein said autograde device follows a preexisting contour and said turfplaner adjust a first side height of said first side of said rotational cutter to mimic said preexisting contour.

17. The method for leveling an area of claim 16 wherein said autograde device comprises an autograde skid capable of engaging with said preexisting contour and moving in concert with changes in said preexisting contour.

18. The method for leveling an area of claim 17 wherein said turfplaner further comprising a controller capable of raising or lowering said first side of said rotational cutter in response to said moving in concert with said changes in said preexisting contour.

19. The method for leveling an area of claim 17 wherein said autograde device comprises a cam which rotates in response to said moving in concert with said changes in said preexisting contour.

20. The method for leveling an area of claim 19 wherein said autograde device comprises at least one detector which detects said rotation of said cam.

21. The method for leveling an area of claim 15 wherein said turfplaner further comprises a pipe roller.

22. The method for leveling an area of claim 21 wherein said turfplaner further comprising an autodepth device wherein said autodepth device maintains said second side of said rotational cutter at a predetermined depth of cut relative to said pipe roller.

23. The method for leveling an area of claim 15 further comprising a conveyor for removing said material.

24. The method for leveling an area of claim 23 wherein said conveyor comprises at least one of an elevator conveyor and an extension conveyor.

25. The method for leveling an area of claim 15 further comprising providing a transport assembly.

26. The method for leveling an area of claim 15 further comprising providing a laser capable of emitting a planer light.

27. The method for leveling an area of claim 26 further at least one receiver capable of receiving said planer light.

28. The method for leveling an area of claim 27 wherein said turfplaner further comprises a system for raising and lowering at least one of said first side of said cutter or said second side of said cutter relative to said planar light.

29. The method for leveling an area of claim 28 wherein said system is a hydraulic system.

* * * * *